(12) United States Patent
Sasaki

(10) Patent No.: US 10,096,153 B2
(45) Date of Patent: Oct. 9, 2018

(54) IMAGE PROCESSING APPARATUS, IMAGE PROCESSING SYSTEM, IMAGE PROCESSING METHOD, AND NON-TRANSITORY COMPUTER READABLE MEDIUM

(71) Applicant: FUJI XEROX Co., Ltd., Tokyo (JP)

(72) Inventor: Makoto Sasaki, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 105 days.

(21) Appl. No.: 15/254,504

(22) Filed: Sep. 1, 2016

(65) Prior Publication Data

US 2017/0256092 A1    Sep. 7, 2017

(30) Foreign Application Priority Data

Mar. 2, 2016   (JP) .................................. 2016-040033

(51) Int. Cl.
| | |
|---|---|
| G06K 9/40 | (2006.01) |
| G06T 15/80 | (2011.01) |
| G06T 7/00 | (2017.01) |
| G06T 7/40 | (2017.01) |
| G06T 5/00 | (2006.01) |

(52) U.S. Cl.
CPC ............. *G06T 15/80* (2013.01); *G06T 5/00* (2013.01); *G06T 7/0002* (2013.01); *G06T 7/40* (2013.01); *G06T 2207/20021* (2013.01)

(58) Field of Classification Search
USPC ........................................................ 382/274
See application file for complete search history.

(56) References Cited

U.S. PATENT DOCUMENTS

| | | | | |
|---|---|---|---|---|
| 2011/0298953 A1* | 12/2011 | Nakamura | ........... | H04N 5/3572 348/241 |
| 2013/0071018 A1* | 3/2013 | Kobiki | ................. | G06K 9/4661 382/165 |
| 2016/0363561 A1* | 12/2016 | Selbekk | ............... | G01N 29/024 |
| 2017/0122807 A1* | 5/2017 | Kasahara | .................. | G01J 3/26 |
| 2017/0193926 A1* | 7/2017 | de Greef | ................ | G09G 3/348 |

FOREIGN PATENT DOCUMENTS

| | | |
|---|---|---|
| JP | 05-040833 A | 2/1993 |
| JP | 4917959 A | 4/2012 |

OTHER PUBLICATIONS

Qi Zhao, et al., "A Closed-Form Solution to Retinex with Nonlocal Texture Constraints", Jul. 2012, IEEE Transactions on Pattern Analysis and Machine Intelligence, pp. 1437-1444, vol. 34, No. 7.

(Continued)

*Primary Examiner* — Jerome Grant, II
(74) *Attorney, Agent, or Firm* — Sughrue Mion, PLLC

(57) ABSTRACT

An image processing apparatus includes an image decomposing unit that decomposes a pixel value of each pixel forming an original image into an illumination component and a reflectance component to generate an illumination component image, and an image composing unit that reflects the illumination component on a sample image serving as a sample of image, and combines the sample image with the illumination component reflected thereon to the original image.

20 Claims, 31 Drawing Sheets

(56) References Cited

OTHER PUBLICATIONS

Ron Kimmel, et al., "A Variational Framework for Retinex", International Journal of Computer Vision, 2003, pp. 7-23, vol. 52, No. 1, Jul. 2003.
Shoji Tominaga, "Control of Tone Characteristics Adapted to Human Visual Sense", The Institute of Image Information and Television Engineers, 2008, pp. 1534-1541, vol. 62, No. 10, Dec. 2008.

* cited by examiner

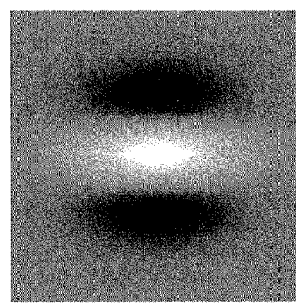
FIG. 7A
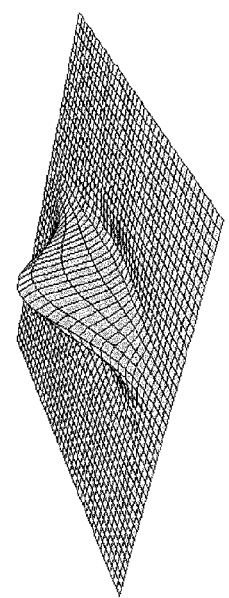
FIG. 7B
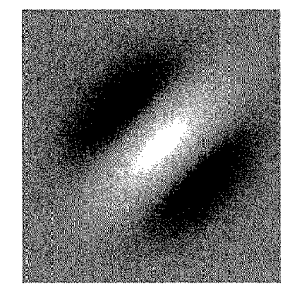
FIG. 7F 135°
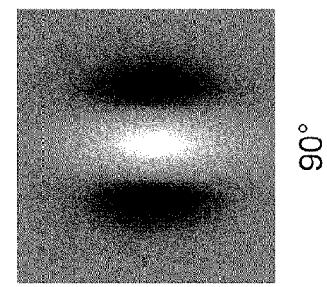
FIG. 7E 90°
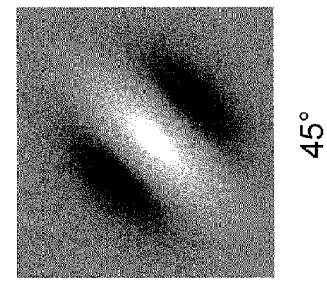
FIG. 7D 45°
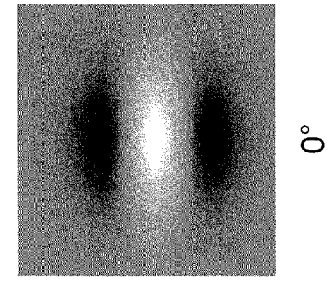
FIG. 7C 0°

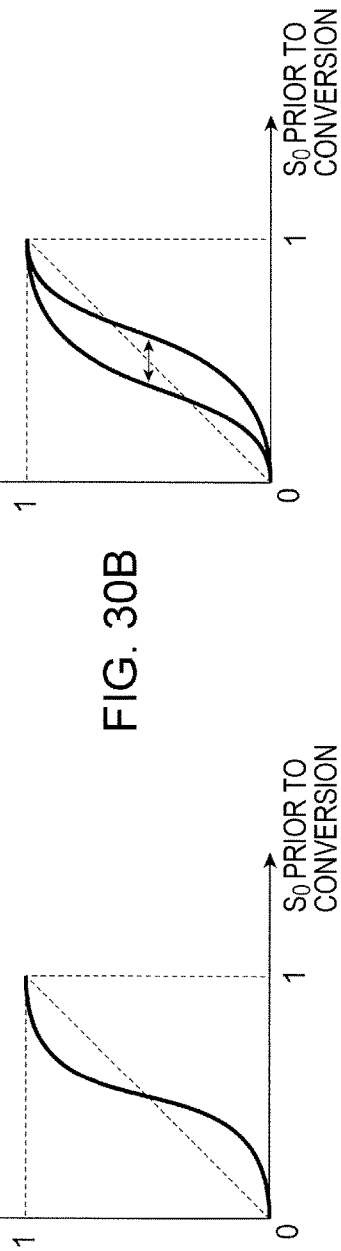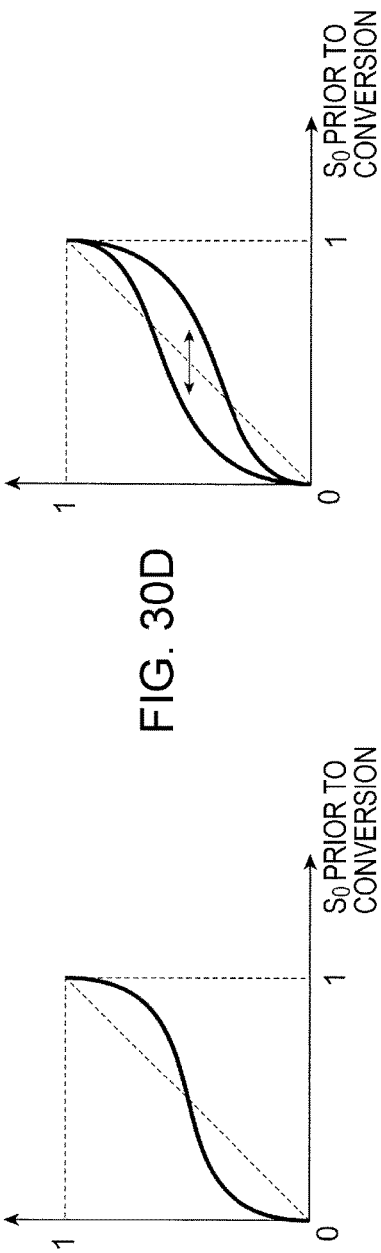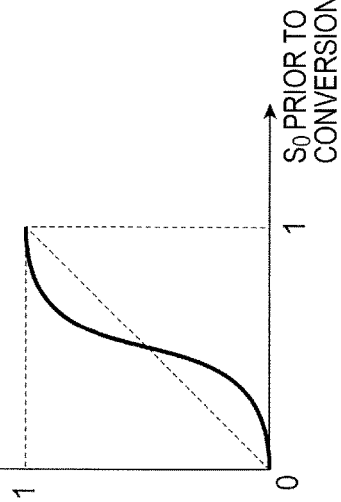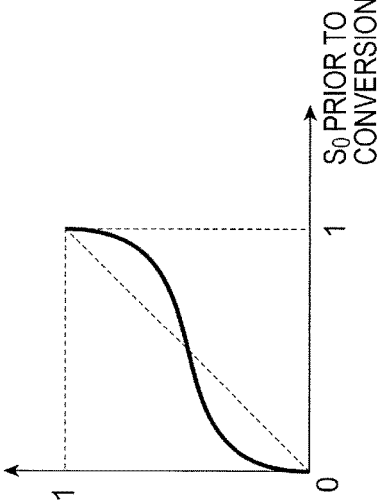
FIG. 30A
FIG. 30B
FIG. 30C
FIG. 30D

IMAGE PROCESSING APPARATUS, IMAGE PROCESSING SYSTEM, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-040033 filed Mar. 2, 2016.

BACKGROUND (i) Technical Field

The present invention relates to an image processing apparatus, an image processing system, an image processing method, and a non-transitory computer readable medium.

(ii) Related Art

In the field of image processing and reconstruction, image quality improvement has been studied using a technique of modifying an entire image to an appropriate image quality level or a technique of finishing the skin of humans, or the sky of a landscape with a more attractive memory color. Controlling texture which appeals to human perception or is caused by touch other than visual sense has been actively studied recently.

SUMMARY

According to an aspect of the invention, there is provided an image processing apparatus. The image processing apparatus includes an image decomposing unit that decomposes a pixel value of each pixel forming an original image into an illumination component and a reflectance component to generate an illumination component image, and an image composing unit that reflects the illumination component on a sample image serving as a sample of image, and combines the sample image with the illumination component reflected thereon to the original image.

BRIEF DESCRIPTION OF THE DRAWINGS

Exemplary embodiments of the present invention will be described in detail based on the following figures, wherein:

FIG. 7A illustrates an image of a DOG function with bearing selectivity imparted thereto, FIG. 7B illustrates a DOG filter (bearing selectivity DOG filter) having bearing selectivity that is produced in accordance with the DOG function with the bearing selectivity of FIG. 7A imparted thereto (bearing selectivity DOG function), and FIG. 7C through FIG. 7F illustrate bearing selectivity filters with angle of rotations as bearings being respectively 0°, 45°, 90°, and 135°;

FIG. 30A through FIG. 30D illustrate functions;

DETAILED DESCRIPTION

Figure 1:
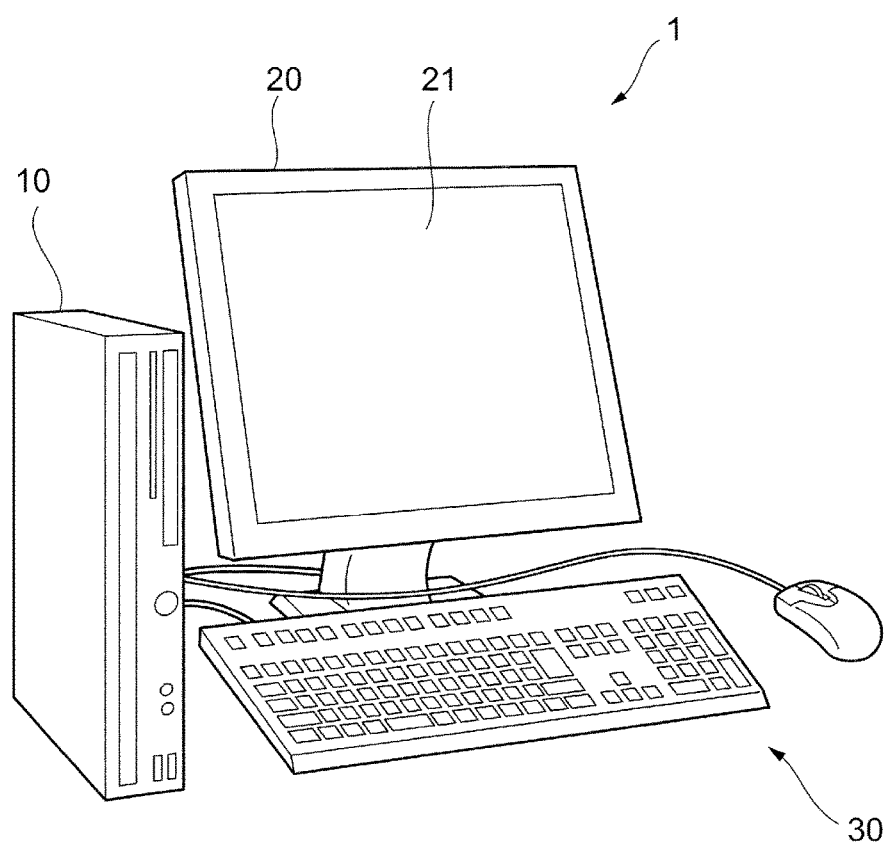
FIG. 1 illustrates a configuration of an image processing system of an exemplary embodiment.

Exemplary embodiments of the present invention are described in detail below with reference to the drawings FIG. 1 illustrates a configuration of an image processing system 1 of an exemplary embodiment.

As illustrated in FIG. 1, the image processing system 1 of the exemplary embodiment includes an image processing apparatus 10, a display device 20, and an input device 30. The image processing apparatus 10 performs image processing on image information displayed on the display device 20. The display device 20 receives image information produced by the image processing apparatus 10, and displays an image responsive to the image information. The input device 30 receives a variety of information a user inputs to the image processing apparatus 10.

The image processing apparatus 10 is a general-purpose personal computer (PC), for example. Under the control of an operating system (OS), the image processing apparatus 10 runs a variety of application software programs, thereby producing the image information, for example.

The display device 20 displays an image on the display screen 21 thereof. The display device 20 may include a display with an additive color mixing function, such as a liquid-crystal display for PC, a liquid-crystal television, or a projector. The display method of the display device 20 is not limited to the liquid-crystal system. In the example of FIG. 1, the display device 20 includes the display screen 21. If a projector is used for the display device 20, the display screen 21 is a screen disposed external to the display device 20.

The input device 30 includes a keyboard, a mouse, and the like. The input device 30 inputs commands to start up or end applications for image processing, or as described in detail below, a command for the user to perform image processing on the image processing apparatus 10 when the image processing is to be performed.

The image processing apparatus 10 and the display device 20 are connected via a digital visual interface (DVI). Alternatively, the image processing apparatus 10 and the display device 20 may be connected using high-definition multimedia interface (HDMI) (registered trademark) or DisplayPort instead of DVI.

The image processing apparatus 10 and the input device 30 are connected via USB (universal serial bus). The image processing apparatus 10 and the input device 30 may be connected using an IEEE1394 cable or an RS-232C cable instead of the USB.

The image processing system 1 displays on the display device 20 an original image prior to image processing. When the user inputs a command for image processing on the image processing apparatus 10 using the input device 30, the image processing apparatus 10 performs the image processing on image information of the original image. The results of the image processing are reflected on the image displayed on the display device 20, and the image subsequent to the image processing is rendered and displayed on the display device 20. In this case, the user may interactively perform the image processing while viewing the display device 20, and may thus perform the image processing more intuitively and easily.

The image processing system 1 of the exemplary embodiment is not limited to the exemplary embodiment of FIG. 1. A tablet terminal may be used for the image processing system 1. In such a case, the tablet terminal includes a touchpanel, and the touchpanel displays an image while receiving a command from the user. In other words, the touchpanel functions as the display device 20 and the input device 30. A touch monitor may be used as a device into which the display device 20 and the input device 30 are integrated. In this case, a touchpanel is used as the display screen 21 of the display device 20. The image processing apparatus 10 produces the image information, and an image is displayed on the touch monitor in response to the image information. The user inputs the command for the image processing by touching the touch monitor.

First Exemplary Embodiment

The image processing apparatus 10 is described as a first exemplary embodiment.

In accordance with the first exemplary embodiment, the shade of the surface of an object is controlled. Control of chromaticity of the surface of the object is also described below.

Figure 2:
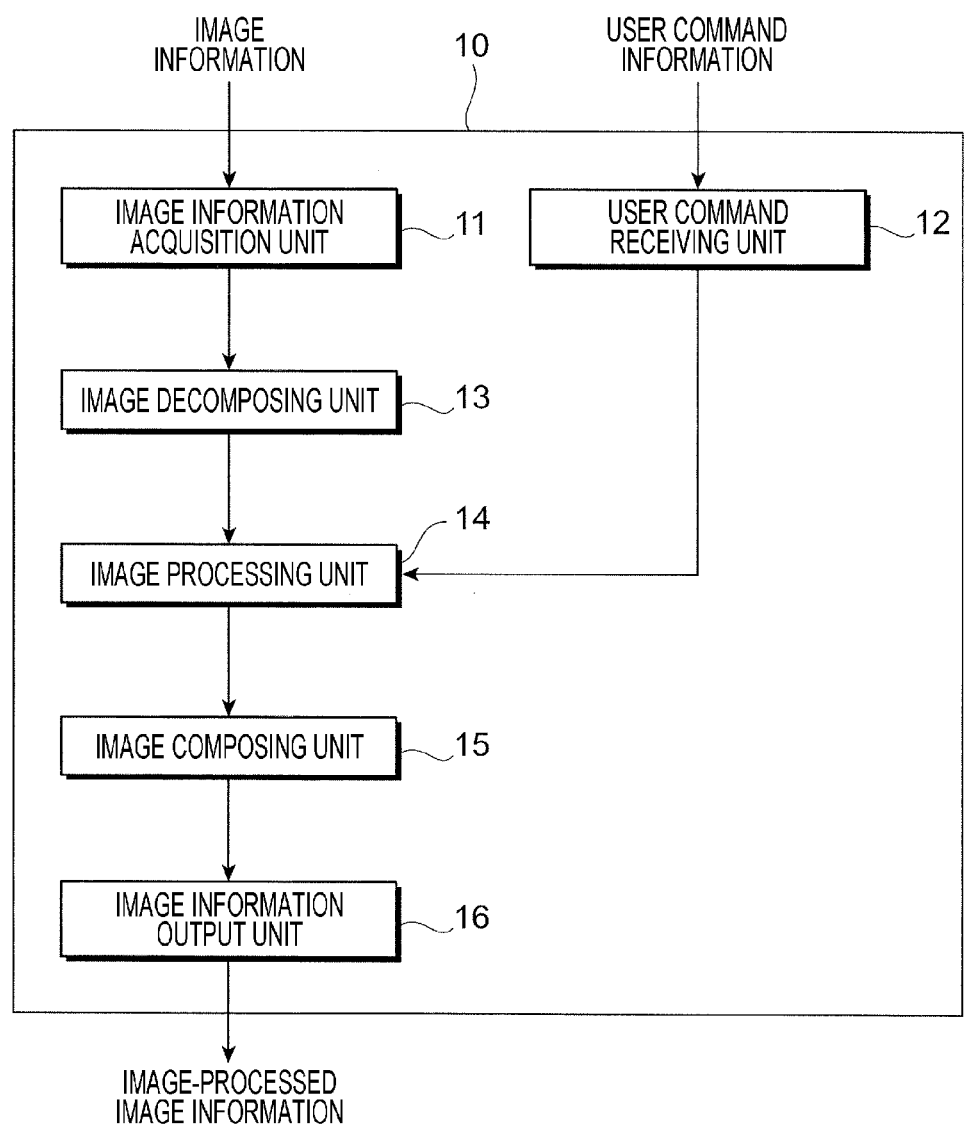
FIG. 2 is a block diagram illustrating a functional configuration of an image processing apparatus.

FIG. 2 is a block diagram illustrating a functional configuration of the image processing apparatus 10. Referring to FIG. 2, specific ones of the functions of the image processing apparatus 10 related to the first exemplary embodiment are selected to be illustrated.

As illustrated in FIG. 2, the image processing apparatus 10 of the first exemplary embodiment includes an image information acquisition unit 11, a user command receiving unit 12, an image decomposing unit 13, an image processing unit 14, an image composing unit 15, and an image information output unit 16.

The image information acquisition unit 11 acquires the image information of an image that is to be image-processed. More specifically, the image information acquisition unit 11 acquires the image information of an original image prior to image processing. The image information is red, green, and blue (RGB) video data (RGB data) to be displayed on the display device 20.

The user command receiving unit 12 receives a user command related to image processing input by the input device 30.

More specifically, the user command receiving unit 12 receives, as user command information, a command for the image processing to be performed by the user on the image displayed on the display device 20.

The image decomposing unit 13 decomposes a pixel value of each pixel forming the original image into an illumination component and a reflectance component, thereby generating an illumination component image and a reflectance component image as images of respective components.

In the first exemplary embodiment, a scene or an object, represented by an image, is decomposed into components representing physical features forming a state of each of the scene or the object in a real scene. When the scene or the object is perceived by a person, the person feels light reflected from the object. In accordance with the first exemplary embodiment, the image is decomposed into an element that is caused when the person feels the texture from the image by estimating an illumination component and a reflectance component of the image of the object.

The illumination component is a component of illumination light emitted to the object, and is a scalar quantity.

The reflectance component is an image component of an object surface that is not dependent on illumination, and is defined by chromaticity. The reflectance component is thus represented by information concerning chromaticity, and is a vector quantity.

The retinex model may be applicable to the estimation of the illumination component. It is known that the human visual system senses brightness of each region in comparison with an ambient region rather than an absolute value of luminance of a scene. This is described in the following literature:

Shoji TOMINAGA "Tone Management: Control of tone reproduction adopted for human vision" Transaction of the Institute of Image Information and Television Engineers Vol. 62, No. 10, pp. 1534-1541 (2008).

The center/surround (C/S) model may be used to estimate the illumination component through the retinex model. The C/S model is based on the premise that an illumination component results from averaging pixel values of pixels surrounding a pixel of interest.

The pixel value of each pixel of an image may now be decomposed into components representing physical characteristics. Each pixel of an original image is a product of an illumination component and a reflectance component.

In the first exemplary embodiment, I represents the pixel value of each pixel of the original image, S represents the illumination component, and R represents the reflectance component. The pixel value I is decomposed into the illumination component S and the reflectance component R in accordance with formula (1):

$$I = SR \quad (1)$$

If the original image is a color image, the pixel value I and the reflectance component R are RGB vectors representing color components, and the illumination component S is a scalar coefficient. The illumination component S represents the surface concave and convex contour, and may thus be regarded as shading. The illumination component S may be regarded as a shading component.

Let $I_L(x,y)$ represent a luminance component of the pixel value of a pixel at a position at coordinates (x,y) of the original image, and S(x,y) represent the estimated illumination component, and S(x,y) is expressed by the following formula (2) in accordance with the C/S model serving as the cognitive model of human vision. In formula (2), the operator $\otimes$ represents a convolution operation.

$$S(x,y) = G(x,y) \otimes I_L(x,y) \quad (2)$$

G(x,y) in formula (2) represents a smoothing filter, and the Gaussian function expressed by formula (3) applies, for example. When formula (3) is integrated with respect to a pixel component of a filter size of image processing, k serves as a coefficient that is used to normalize the integration result to 1. Let σ represent the degree of smoothing (scale), and the larger the degree of smoothing σ is, the more blurrier the convolution image becomes. Formula (3) representing G(x, y) is an example of function. Any filter is applicable as long as the filter provides similar (smoothing) results.

$$G(x, y) = k \exp\left(-\frac{x^2 + y^2}{\sigma^2}\right) \quad (3)$$

The luminance component $I_L(x,y)$ in formula (2) may be represented by a Y value in the YCbCr color space into which a pixel value of the original image in the RGB color space is converted, a V value in the HSV color space into which the pixel value in the RGB color space is converted, and an L* value in the L*a*b* color space into which the pixel value in the RGB color space is converted. Since the L*a*b* color space is adequate for human perception, the L* value may be used as is as the illumination component S. More specifically, S(x,y)=L*(x,y). The illumination component S may also be used for a luminance component in the other color space. For example, S(x,y)=Y(x,y) holds if the Y value in the YCbCr color space is used. S(x,y)=V(x,y) holds if the V value in the HSV color space is used. The luminance component $I_L(x,y)$ may be replaced with a bilateral filter that accounts for edge.

Formula (3) may be extended to arrange N levels of smoothing scale in σ, and the illumination component may be estimated from the weighted average of multiple smoothing scales.

In such a case, formula (3) is modified to be formula (4). Wn in formula (4) represents a weight. A simple form of the weight is 1/N, for example.

$$S(x, y) = \sum_{n=1}^{N} W_n G_n(x, y) \otimes I_L(x, y) \quad (4)$$

The method described above is based on the C/S model that is the cognitive model of human vision.

The accuracy of the illumination component may be even more increased by estimating the illumination component S under physical constraint condition that is possible under an actual scene.

For example, the hypothesis that illumination light is smooth in space is described the following transaction:

R. Kimmel, M. Elad, D. Shaked, R. Keshet, and I. Sobel, "A variation framework for retinex." Int. J. Computer Vision, Vol. 52, No. 1, pp. 7-23, January 2003.

Formula (5) that is formulated by referencing an energy formula that models the hypothesis is defined as follows:

$$E(S) = \iint (|\nabla S|^2 + \alpha(S-I_L)^2 + \beta|\nabla(S-I_L)^2|)dxdy \quad (5)$$

The illumination component may be estimated by calculating the illumination component S minimizing E(S) using Euler-Lagrange equation. Here, α and β are parameters related to the degree of spatial smoothness.

In order to separate only the illumination component S is to be separated at a higher accuracy level in an object having a shape of complex color information, a method of discriminating between a shade of illumination and a difference step caused by chromaticity in response to chromaticity of adjacent pixels may be applied. The difference step in chromaticity may be calculated by comparing distances between normalized RGB values. Alternatively, as disclosed in the following transaction, the difference step in chromaticity may be calculated by reflecting the difference on an energy formula that satisfies a condition for the illumination component:

Qi Hhaok Ping Tan, Qiang Dai, Li Shen, Enhua Wu and Stephen Lin, "A Closed-form solution to Retinex with Non-local Texture Constraints", Pattern Analysis and Machine Intelligence, IEEE Transactions on Vol. 34 (7), pp. 1437-1444.

Figure 3:
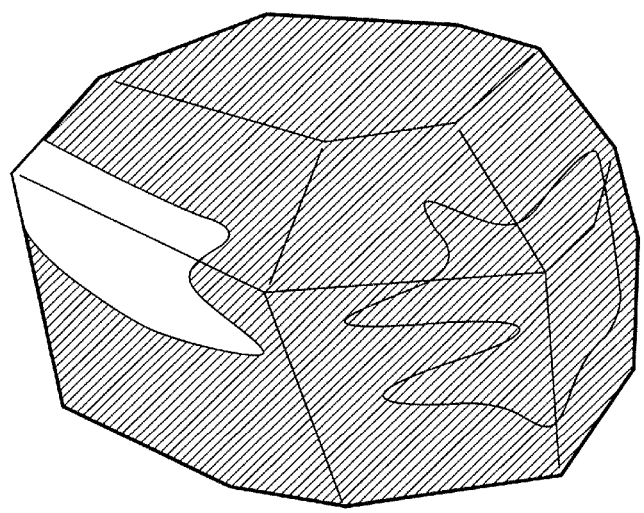
FIG. 3 illustrates an object in a natural color image.

FIG. 3 illustrates an object in a natural color image.

Figure 4A:
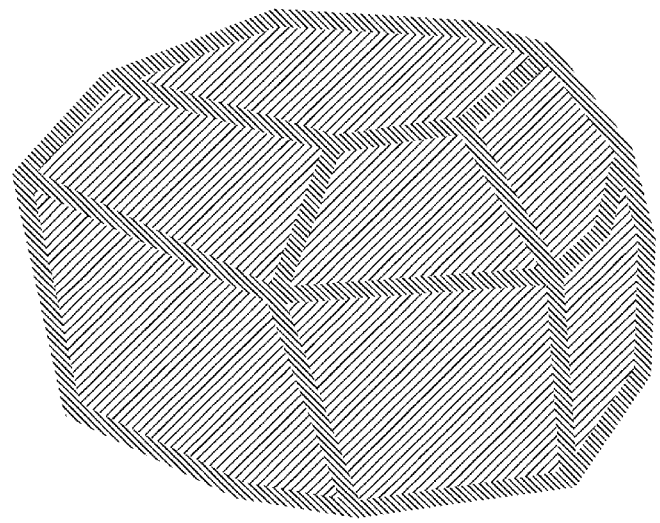
FIG. 4A and FIG. 4B illustrate illumination components determined by a method of the image processing apparatus.
Figure 4B:
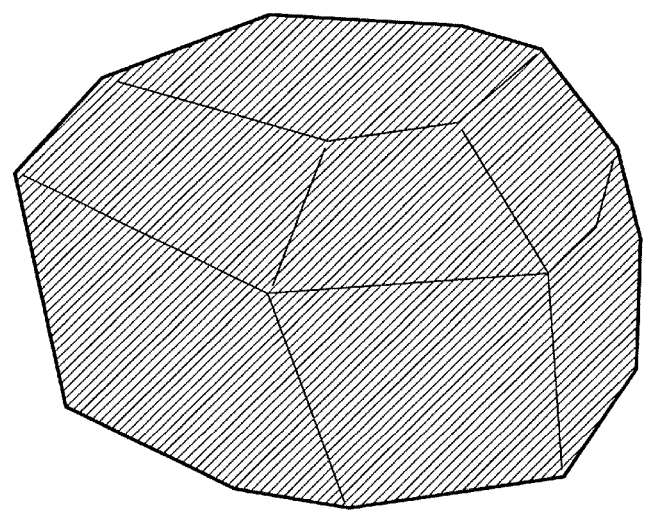

FIG. 4A and FIG. 4B illustrate the illumination component S determined using the methods described above.

The estimation of the illumination component S and the reflectance component R from the image is an ill-posed problem, and it is difficult to calculate an exact answer. The solution also depends on the definition of the illumination component S in the algorithm.

In a typical fashion, however, the illumination component S of the object is calculated in the form of the image as illustrated in FIG. 4A or FIG. 4B (as an illumination component image). More specifically, information about the shade of the object is extracted although the edges are different between FIG. 4A and FIG. 4B. To enhance information about the edges, an image that is a product of the image of FIG. 4A and the image of FIG. 4B may be used as the illumination component S.

The reflectance component R is an RGB vector and represents the chromaticity of the object. In accordance with the first exemplary embodiment, the reflectance component R is expressed by formula (6):

$$R=(R_r, R_g, R_b) \quad (6)$$

Since the reflectance component R represents a rate, and thus desirably falls within a range of from 0 to 1. Rr, Rg, and Rb of the components of a vector representing the reflectance component R are desirably set to satisfy 0≤Rr, Rg, Rb≤1.

Let I=($I_R$, $I_G$, $I_B$) be a vector representing a pixel value may be in an original color image color image, and the sum of $I_R$, $I_G$, and $I_B$ normalized with each component may be regarded as the reflectance component R as described in the transaction by Qi et al. To control the image, the reflectance component R may be $I_R$, $I_G$, and $I_B$, each of which is simply normalized by a maximum value of a signal of the original image as expressed in formula (7). In formula (7), each of $I_R$, $I_G$, and $I_B$ may be represented by one of numbers within a range from 0 through 255. The maximum value is thus 255. In accordance with formula (1), $I_R$, $I_G$, and $I_B$ may be divided by the illumination component (shade component) S, and may then be set to be within a range of from 0 through 1 as a vector representing the reflectance component R.

$$R = (R_r, R_g, R_b) = \left(\frac{I_R}{255}, \frac{I_G}{255}, \frac{I_B}{255}\right) \quad (7)$$

Figure 5:
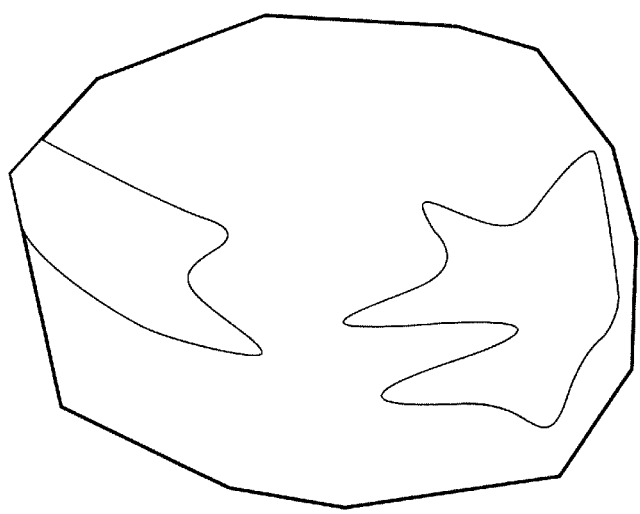
FIG. 5 illustrates results that are obtained by calculating a reflectance component of the object as an image (a reflectance component image)

FIG. 5 illustrates results that are obtained by calculating a reflectance component of the object as an image (a reflectance component image).

FIG. 5 indicates that three-dimensional information corresponding to the shade is removed because the three-dimensional information depends on the illumination component S. An RGB value is a gradation value. The RGB value, if expressed in 8 bits, is an integer value within a range of from 0 through 255. If the illumination component S and the reflectance component R are calculated as in the first exemplary embodiment, it may be convenient if the RGB value falls within a range from 0 through 1. Alternatively, the pixel value I and the illumination component (shade component) S of the original image may be represented by a number within a range from 0 through 255, and only the reflectance component R may be represented by a value falling within a range of from 0 through 1.

Turning to FIG. 2, the image processing unit 14 performs image processing on at least one of the illumination component image and the reflectance component image.

The case of performing the image processing on the illumination component image is described first.

In accordance with the first exemplary embodiment, the image processing unit 14 controls the shade of the illumination component image. More specifically, the image processing unit 14 controls the illumination component serving as a component of illumination light emitted to the object, thereby newly creating a light portion caused by the illumination and a dark portion. As a result, the texture, such as a concave and convex contour and shape of the object surface, is changed. The feature of the first exemplary embodiment is creating a component leading to the factor of texture. For example, this component is an image that is created in response to a random noise. The image processing unit 14 controls the shade of the illumination component image using the image created in response to the random noise, thereby changing the texture of the object surface. The image that has resulted from controlling the shade of the illumination component image and has undergone the image processing is also referred to as a "shade controlled image".

More specifically, the image processing unit 14 combines the random noise with a difference-of-two-Gaussian (DOG) filter, and creates the shade controlled image using a shade texture image created by the combination. Through this process, the image processing unit 14 expresses a variety of shade textures.

The DOG filter is known as a mathematical model of visual characteristics in the human brain responsive to a particular frequency band, and expressed by the following formula (8). The DOG filter is a filter that is based on a DOG function.

$$G_{DOG}(x, y) = \frac{1}{2\pi\sigma_e^2} e^{-\frac{x^2+y^2}{2\sigma_e^2}} - A\frac{1}{2\pi\sigma_i^2} e^{-\frac{x^2+y^2}{2\sigma_i^2}} \quad (8)$$

Figure 6B:
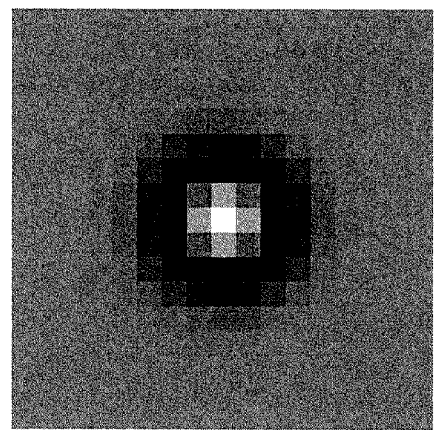
FIG. 6B illustrates a DOG filter based on a two-dimensional DOG function of FIG. 6A.
Figure 6A:
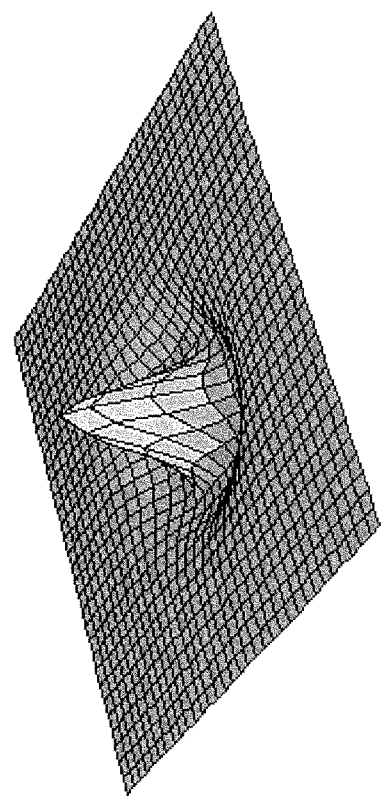
FIG. 6A is an image of a difference of two Gaussians (DOG)

FIG. 6A is a visualized image of the DOG function, and illustrates a concept of a two-dimensional DOG function. FIG. 6B is a DOG filter that is produced from the two-dimensional DOG function of FIG. 6A.

In formula (8), the smaller the value of $\sigma_e$, the stronger the reaction in higher frequency becomes. $\sigma_i$ is set to be a value larger than the value of $\sigma_e$. The coefficient A is capable of controlling the relative intensity of a positive Gaussian value and a negative Gaussian value. As the coefficient A approaches zero, the filter becomes closer to a "blur" filter.

A DOG filter having bearing selectivity in image space may be contemplated, and is expressed by the following formula (9):

$$H(x, y) = \left(\frac{1}{\sqrt{2\pi}\,\sigma_{x,e}} e^{-\frac{x^2}{2\sigma_{x,e}^2}} - \frac{1}{\sqrt{2\pi}\,\sigma_{x,i}} e^{-\frac{x^2}{2\sigma_{x,i}^2}}\right) \frac{1}{\sqrt{2\pi}\,\sigma_y} e^{-\frac{y^2}{2\sigma_y^2}} \quad (9)$$

In formula (9), $\sigma_{x,e}$ represents a variance of excitability of reaction responsive to the luminance component, and $\sigma_{x,i}$ represents a variance of suppression of reaction. $\sigma_y$ represents a variance of a particular bearing, and is a parameter that determines the degree of blurriness in an extracted bearing component.

By imparting the bearing selectivity to formula (9) with an angle of rotation φ specified, the DOG filter becomes a filter expressed by formula (10) that responds to a particular bearing.

$$H_\phi(x,y)=H(x\cos\phi-y\sin\phi, x\sin\phi+y\cos\phi) \quad (10)$$

FIG. 7A illustrates an image into which the DOG function with the bearing selectivity imparted thereto is visualized. FIG. 7B illustrates a DOG filter (bearing selectivity DOG filter) having bearing selectivity that is produced in accordance with the DOG function with the bearing selectivity of FIG. 7A imparted thereto (bearing selectivity DOG function).

FIG. 7C through FIG. 7F illustrate bearing selectivity filters with angle of rotations as bearings being respectively 0°, 45°, 90°, and 135°.

A shade texture responsive to the particular band and bearing is generated using the filter of formula (10). In the above example, the filter creating the shade texture is based on the DOG function. The first exemplary embodiment is not limited to this example. As long as frequency and bearing are controlled, any type of filter is acceptable. For example, a Gabor filter may be used.

Figure 8:
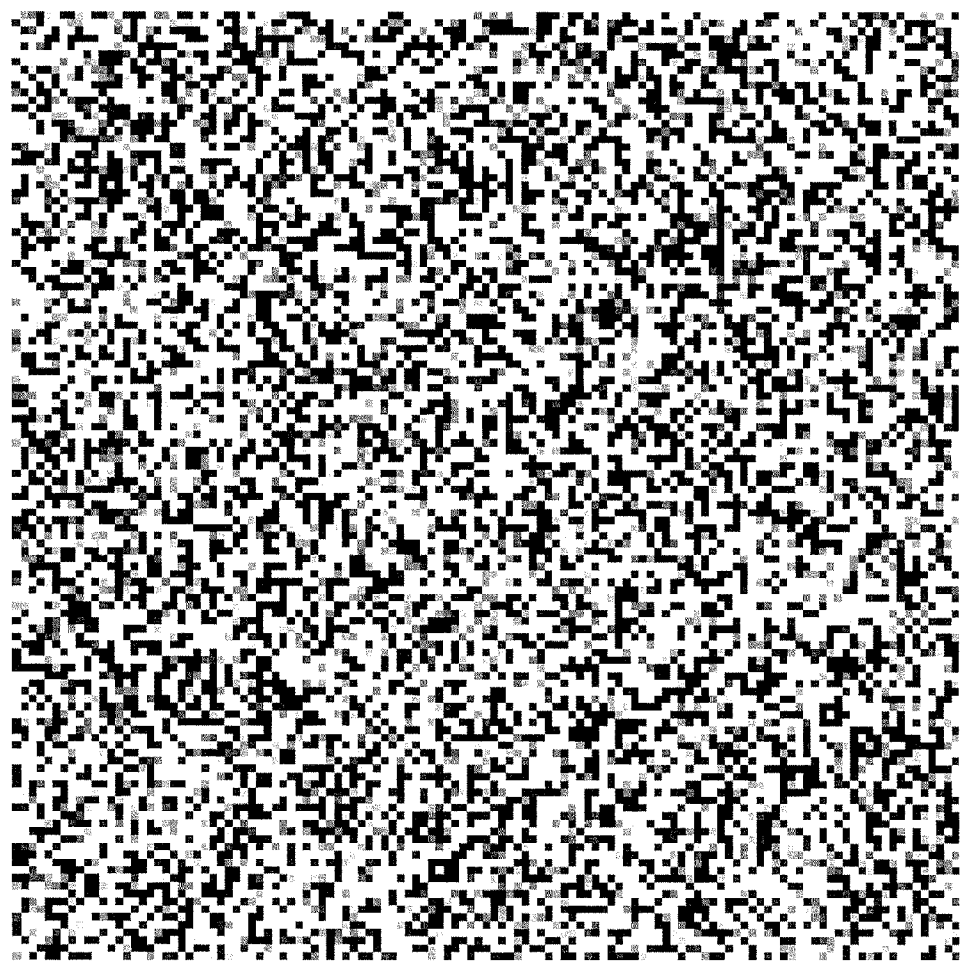
FIG. 8 is a random-noise image responsive to a random noise.

FIG. 8 is a random-noise image into which a random noise is visualized.

Figure 9:
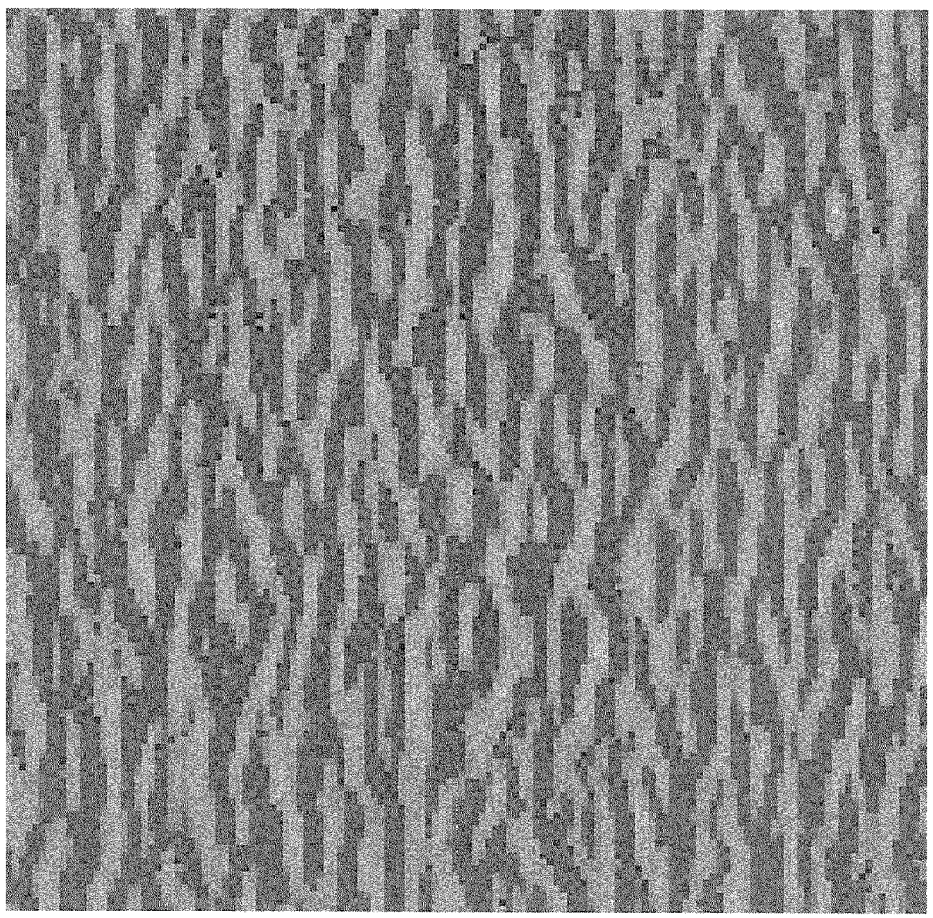
FIG. 9 illustrates a shade texture image that results from applying formula (9) on the random-noise image of FIG. 8.

FIG. 9 illustrates a shade texture image that results from applying formula (10) on the random-noise image of FIG. 8.

Referring to FIG. 9, the bearing selectivity DOG filter with an angle of rotation $\phi$ of 90° illustrated in FIG. 7E is applied to the random-noise image.

Figure 10B:
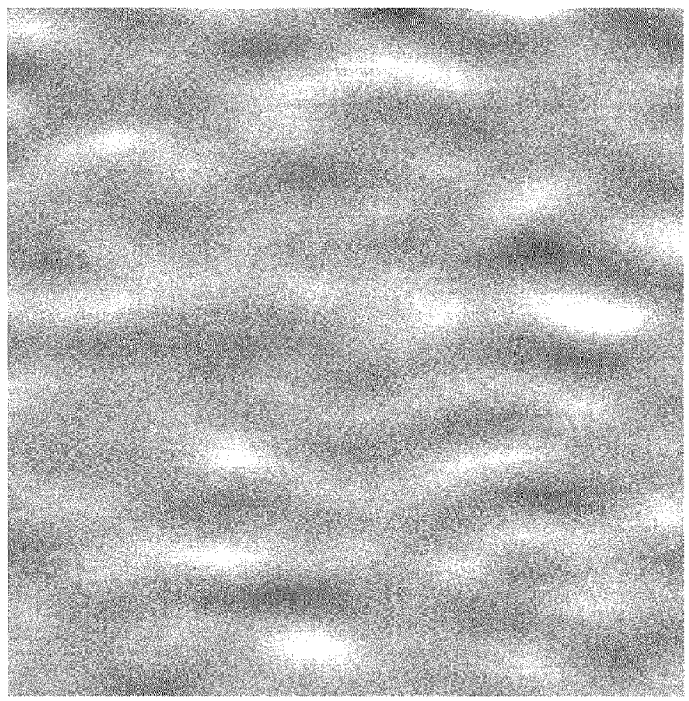
FIG. 10A and FIG. 10B illustrate other examples of the shade texture images that result from applying formula (9) on the random-noise image of FIG. 8.
Figure 10A:
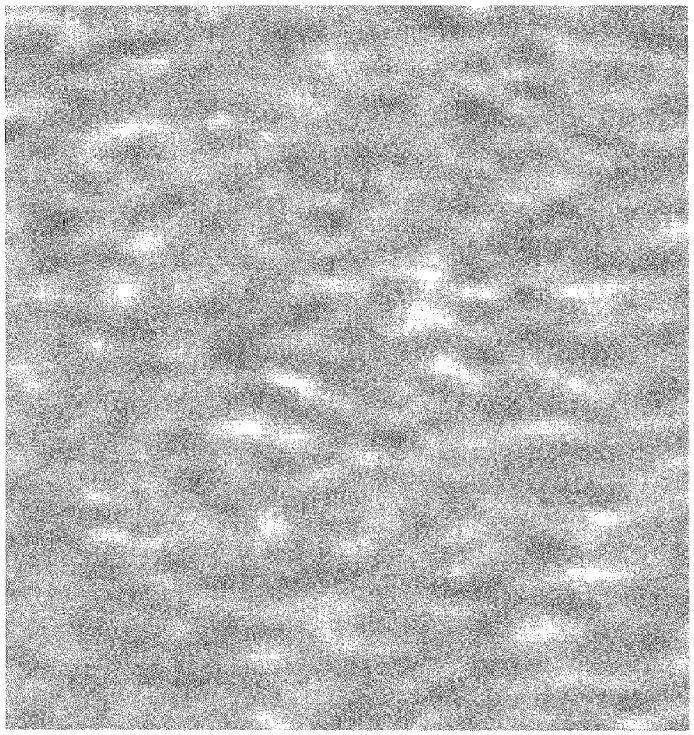

FIG. 10A and FIG. 10B illustrate other examples of the shade texture images that result from applying formula (10) on the random-noise image of FIG. 8.

The shade texture images of FIG. 10A and FIG. 10B are obtained by modifying the parameters $\sigma_{x,e}$, $\sigma_{x,i}$, and $\sigma_y$ of formula (9) in the image of FIG. 9. The DOG filter exhibits a good response to any frequency band. Even if a similar random noise image is used, blurring or extension of noise is possible depending on a combination of the parameters $\sigma_{x,e}$, $\sigma_{x,i}$, and $\sigma_y$ of formula (9). As a result, a variety of texture representation is possible. More specifically, the image processing unit 14 may control the shade of the illumination component image using an image which is controlled in the frequency and bearing of the random noise.

Let $S_o$ represent the illumination component expressed by formula (1), and $S_d$ represent the component of the shade texture image thus created, and the illumination component S of the shade controlled image generated by the image processing unit 14 is expressed by formula (11):

$$S=S_o S_d \quad (11)$$

From the standpoint of controlling the shade, $S_o$ and $S_d$ are desirably expressed in the form of product of formula (11) to determine S. The determination of the illumination component S is not limited to this method. Alternatively, the illumination component S may be determined in the form of summing of weighted averages.

In formula (11), the texture caused by newly created shade may be reproduced while the shade of the original image is maintained. In accordance with the first exemplary embodiment, the shade texture image may be distorted in response to three-dimensional perception of humans. More specifically, the component $S_d$ of the shade texture image may be distorted such that a depth is expressed in view of the shape of the object. Let (x,y) represent the location of an image in a region where the shade is controlled, the left side of formula (11) is S(x,y), and the right side of formula (11) is the product of $S_o(x,y)$ and $S_d(x,y)$. $S_o(x,y)$ and $S_d(x,y)$ are similar in format, and $S_d(x,y)$, if expressed in $S_d(x,y)$ as in formula (12), may represent the distortion.

$$S(x,y)=S_o(x,y)S_d(x+\Delta x, y+\Delta y) \quad (12)$$

The image processing unit 14 expresses a distortion by displacing the location of the component $S_d$ of the shade texture image on the image. Let $\Delta x$ and $\Delta y$ represent displacements. In order to cause $\Delta x$ and $\Delta y$ to match the human three-dimensional perception as much as possible, $\Delta x$ and $\Delta y$ may be determined in response to gradients of the illumination component S as expressed in formula (13) in the image of the illumination component S:

$$\Delta x = F_x(S_{gx}(x,y))$$

$$\Delta y = F_y(S_{gy}(x,y)) \quad (13)$$

$F_x$ and $F_y$ represents functions that determine distortion amounts in coordinates, based on the gradients of the illumination component S, and $S_{gx}$ and $S_{gy}$ represent amounts that represent the gradients of the illumination component S or amounts that depends on the gradients. For example, with $F_x$ and $F_y$ in their simpler form, the distortion amount may be represented by multiplying $S_{gx}$ and $S_{gy}$ by coefficients.

Figures 11A, 11B:
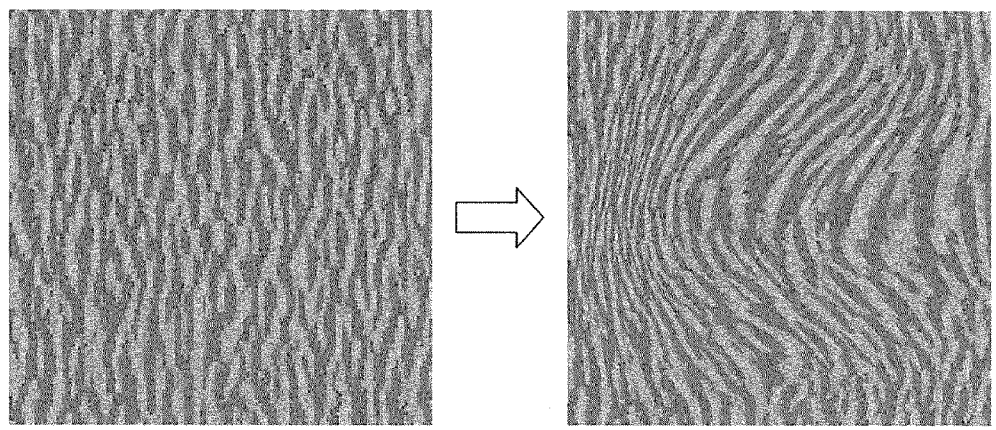
FIG. 11A and FIG. 11B illustrate examples of the shade texture images that are generated in accordance with formula (13)

FIG. 11A and FIG. 11B illustrate examples of the shade texture image that is created using formula (13).

FIG. 11A illustrates the shade texture image similar to that of FIG. 9. FIG. 11B illustrates the shade texture image that is distorted using formula (13).

The shade texture image of FIG. 11B is obtained by distorting the shade texture image of FIG. 11A.

An amount in a simpler form representing the gradient of the illumination component S is an amount that is obtained by simply reflecting a difference from an adjacent pixel on the amount. An amount in a more complex form representing the gradient of the illumination component S may be calculated using one of the DOG filters expressed by formulas (8) through (10).

In accordance with the first exemplary embodiment as described above, the distortion amount may be determined, based on the gradient of the illumination component S or the amount depending on the gradient, in accordance with formula (13). Any other method may be acceptable as long as the method estimates the depth.

The texture of the newly created shade become more realistic by distorting the shade texture image.

FIG. 11B illustrates a shade controlled image that is generated by reflecting an illumination component S determined using formulas (11) through (13) on an illumination component image illustrated in FIG. 4B.

As illustrated in FIG. 11B, the shade of the surface of the object is controlled, and the texture of the object changes.

The image processing unit 14 varies a tone curve on the illumination component $S_o$, thereby controlling the shade. The image processing unit 14 may perform a conversion using a histogram, instead of varying the tone curve. Furthermore, the image processing unit 14 may use a function or a conversion rule that reflects a combination of the tone curve and the histogram.

Figure 12:
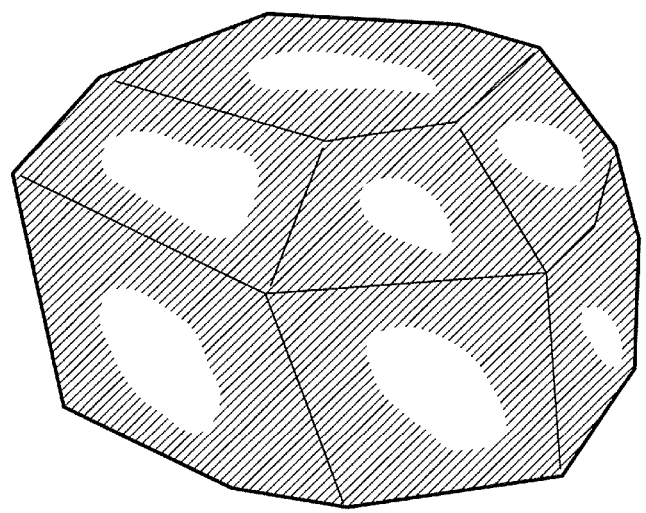
FIG. 12 illustrates a shade controlled image that is generated by varying a tone curve of the illumination component image of FIG. 4B.

FIG. 12 illustrates a shade controlled image that is produced by varying the tone curve of the illumination component image of FIG. 4B.

As illustrated in FIG. 12, an image with a concave and convex contour enhanced is thus generated.

Figure 11C:
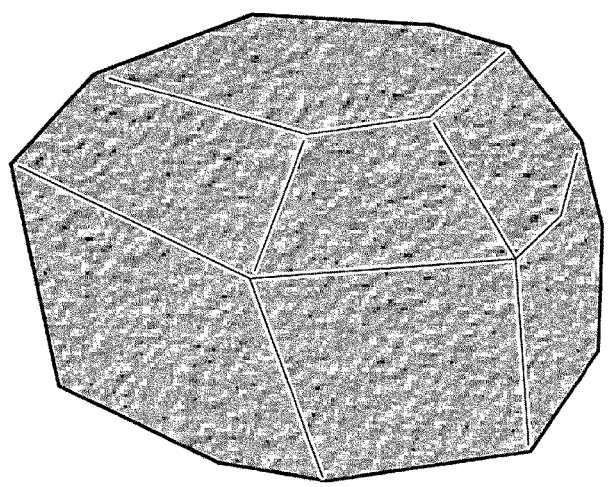
FIG. 11C illustrates a shade controlled image that is generated by reflecting an illumination component determined using formulas (11) through (13) on an illumination component image illustrated in FIG. 4B.
Figure 13:
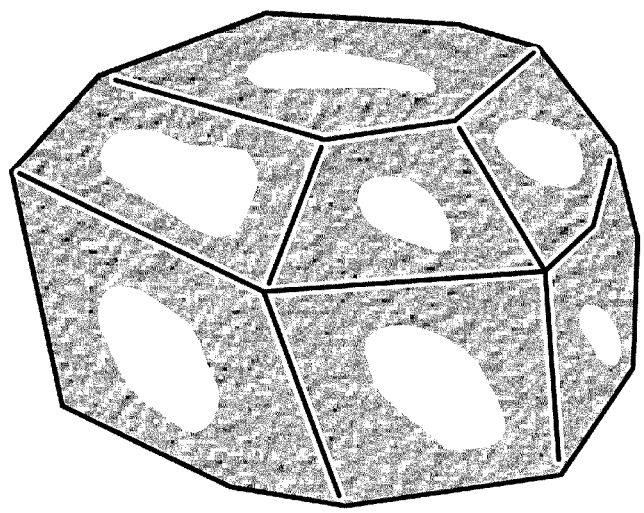
FIG. 13 illustrates a shade controlled image that is generated by further varying a tone curve of the shad control image of FIG. 11.

FIG. 13 illustrates a new shade controlled image that is generated by varying a tone curve of the shade controlled image of FIG. 11C.

As illustrated in FIG. 13, the image is enhanced in concave and convex contour and shade in contrast to the image in FIG. 11C.

The image processing to be performed on the reflectance component image is described below.

In the first exemplary embodiment, the reflectance component R represents chromaticity of the object. In accordance with the first exemplary embodiment, characteristics related to chromaticity are controlled, and as a result, chromaticity is added to or removed from the reflectance component image. Controlling of chromaticity is performed on the reflectance component image, and the image that has undergone the image processing may also be hereinafter referred to as a "chromaticity controlled image".

Figure 14:
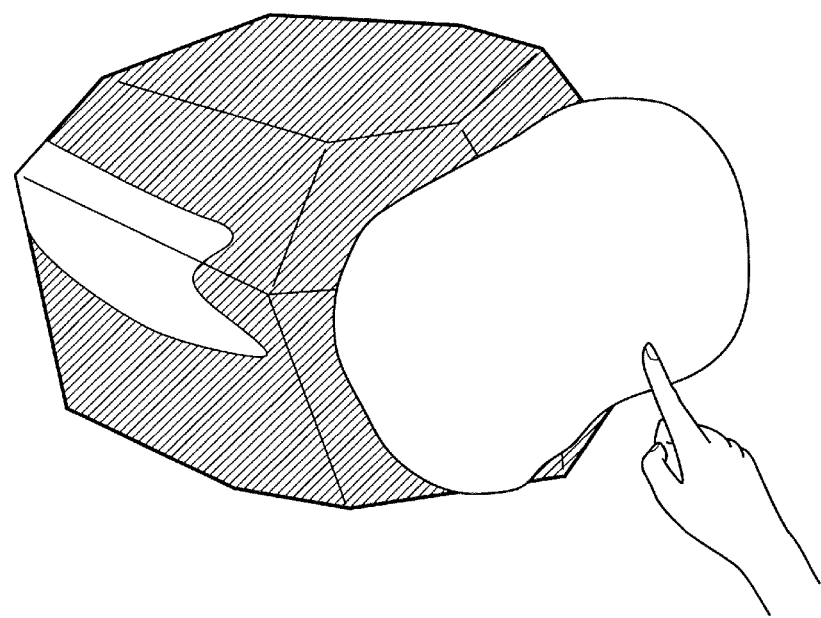
FIG. 14 illustrates an operation performed by a user on a screen.

If a user fills the image of FIG. 3 on the screen with the same shade as the background region of the object as illustrated in FIG. 14, software internally recognizes this operation as an operation to delete color information of the reflectance component image.

Figure 15A:
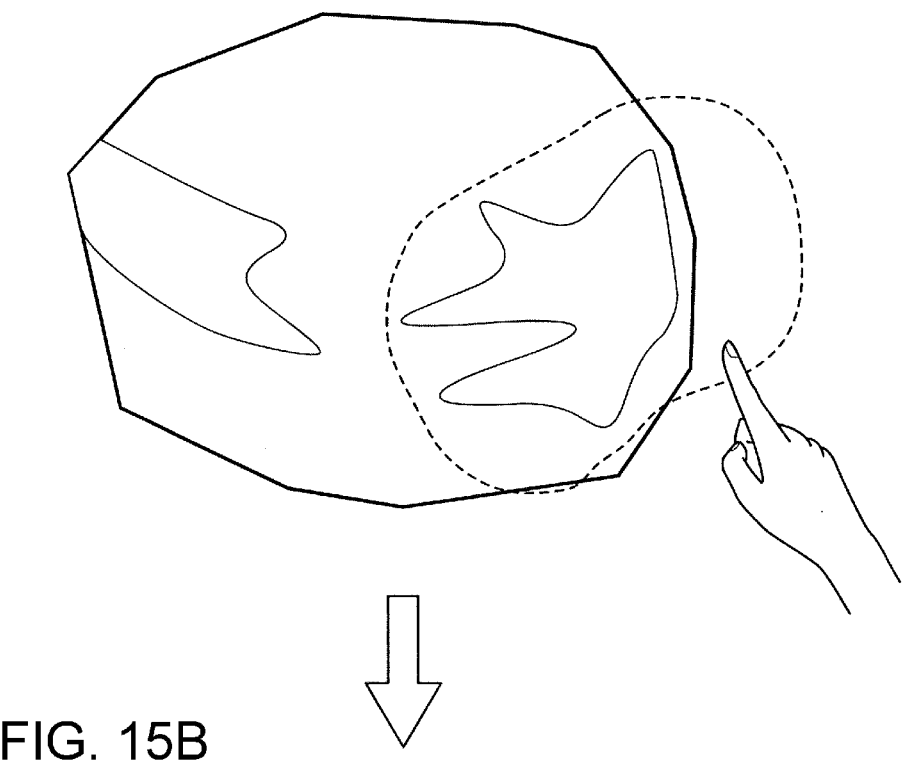
FIG. 15A and FIG. 15B illustrate chromaticity controlled images that are generated in the operation.
Figure 15B:
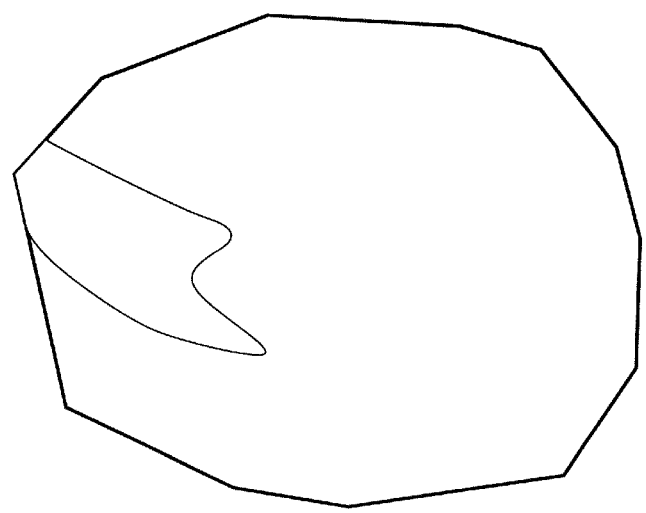

FIG. 15A and FIG. 15B illustrate the color control images thus generated.

The reflectance component image of FIG. 15A is similar to the image of FIG. 5, and is the image prior to deletion of the color information. When the user performs the operation of FIG. 14, part of the color information of the reflectance component image illustrated in FIG. 15A is erased, and the color control image of FIG. 15B results.

Figure 16:
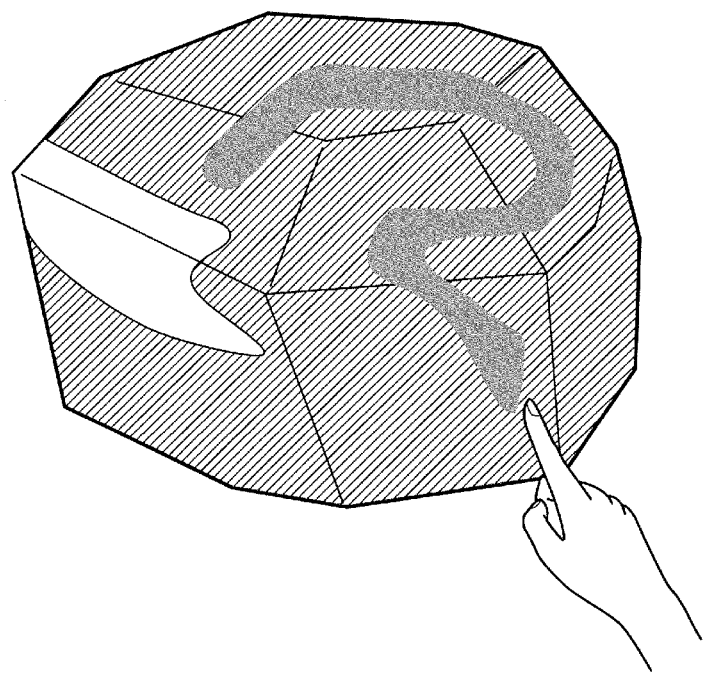
FIG. 16 illustrates on an image a deep colored pattern a user has drawn using a pen.

Conversely, coloring is also possible. As illustrated in FIG. 16, for example, the user may draw a deep-colored pattern on the screen using a pen, software internally recognizes this operation as an operation to embed the color information in the reflectance component image.

Figure 17:
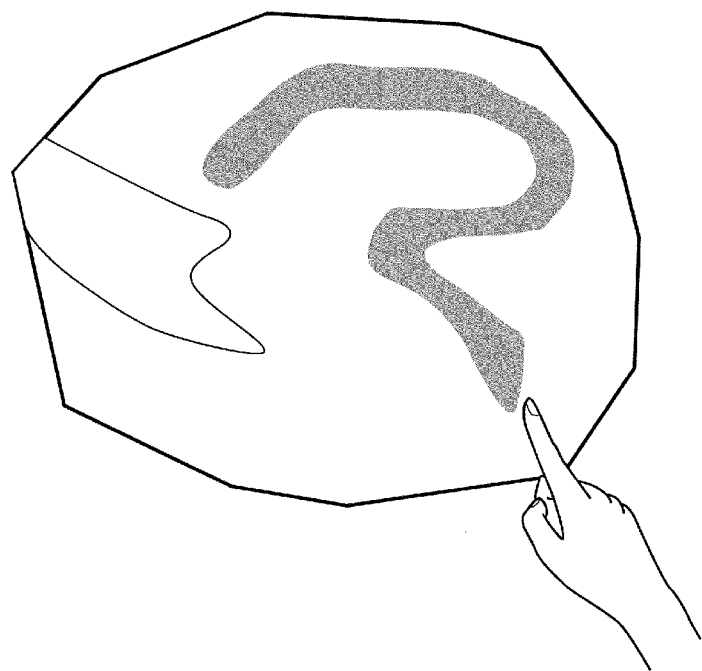
FIG. 17 illustrates a change in the reflectance component image.

FIG. 17 illustrates a change having occurred in the reflectance component image.

FIG. 17 illustrates an image when the user performs the operation of FIG. 16 subsequent to the operation of FIG. 14. In contrast to the color control image of FIG. 15B, FIG. 17 indicates that the color information of the pattern has been embedded in the color control image.

If redundant color information is erased, or desired color information is added on the screen, the results look like that the object is painted in an actual scene.

Turning back again to FIG. 2, the image composing unit 15 composes the image subsequent to the image processing by the image processing unit 14.

Figure 18A:
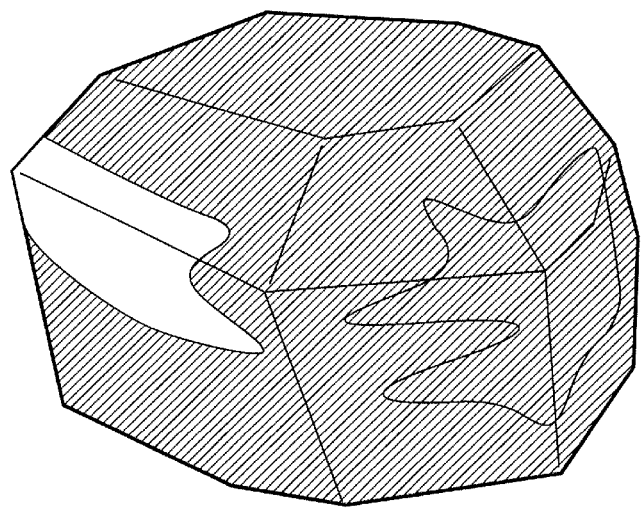
FIG. 18A and FIG. 18B illustrate examples of image-processed images that have undergone image compositing by an image composing unit.
Figure 18B:
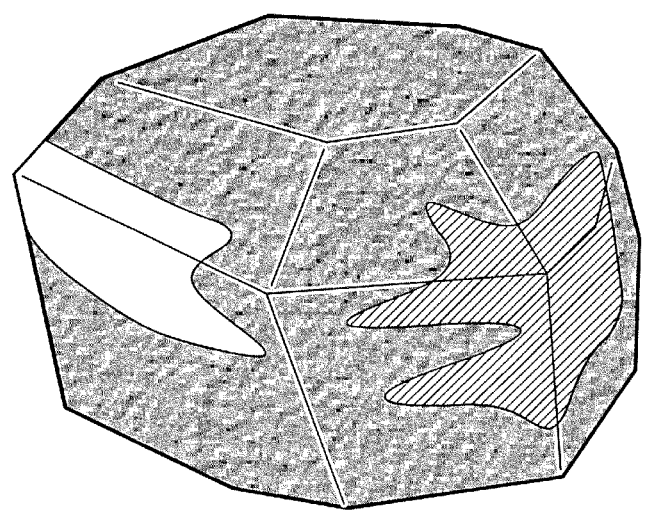

FIG. 18A and FIG. 18B illustrate examples of image-processed images the image composing unit 15 has composed.

FIG. 18A illustrates the image similar to the original image of FIG. 3.

FIG. 18B illustrates the image into which the shade controlled image with the shade of FIG. 11 controlled and the reflectance component image of FIG. 5 are combined in accordance with formula (1). As illustrated in FIG. 18B, the obtained image is controlled in the texture of the object surface, namely, in the characteristics related to the concave and convex of the shade.

Let I' represent the pixel value of each pixel of the image composed by the image composing unit 15, S represent the illumination component ($S=S_oS_d$ in accordance with formula (11)), and R represent the reflectance component, and I' is expressed by the following formula (14):

$$I'=SR=S_oS_dR \qquad (14)$$

Figure 19A:
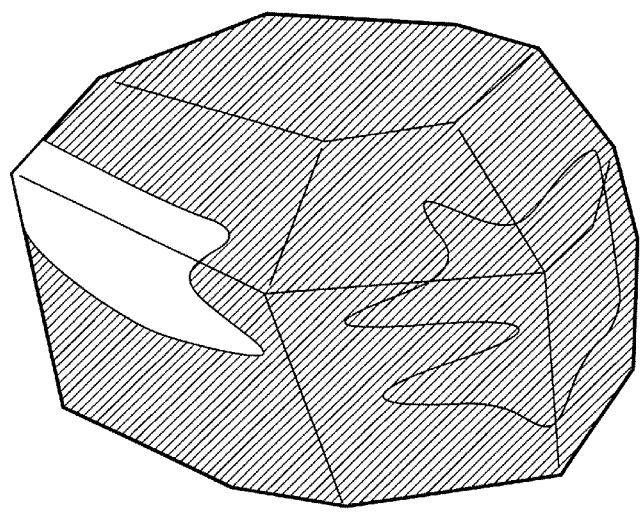
FIG. 19A and FIG. 19B illustrate other examples of the image-processed images that have undergone the image composing by the image composing unit.
Figure 19A:
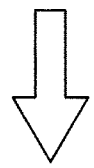
Figure 19B:
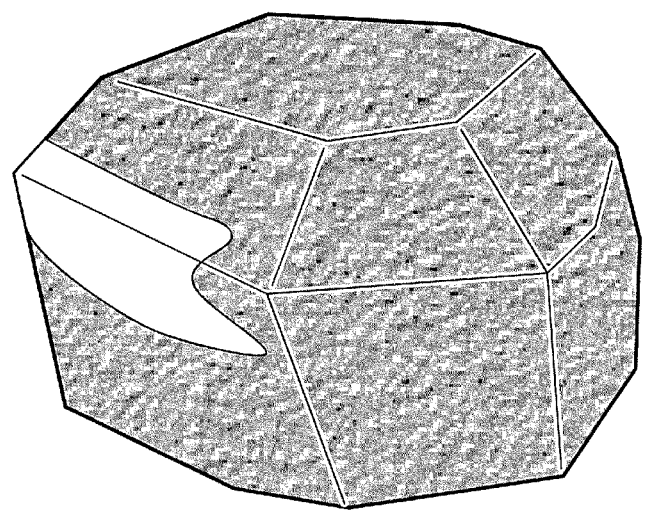

FIG. 19A and FIG. 19B illustrate other examples of the image-processed images the image composing unit 15 has composed.

FIG. 19A is similar to the original image of FIG. 3.

FIG. 19B is an image on which the user has performed the operation of FIG. 14. More specifically, FIG. 19B illustrates the image of FIG. 18B with part of the color information of the shade controlled image erased.

Figure 19C:
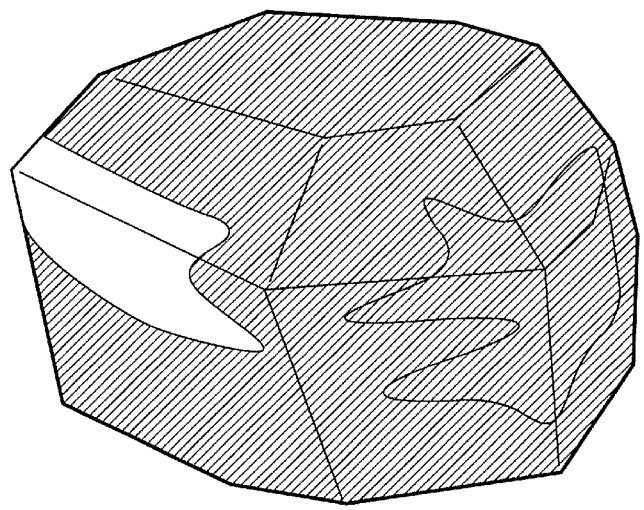
FIG. 19C and FIG. 19D illustrate other examples of the image-processed images that has undergone the image composing by the image composing unit.
Figure 19C:
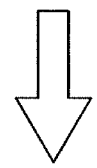
Figure 19D:
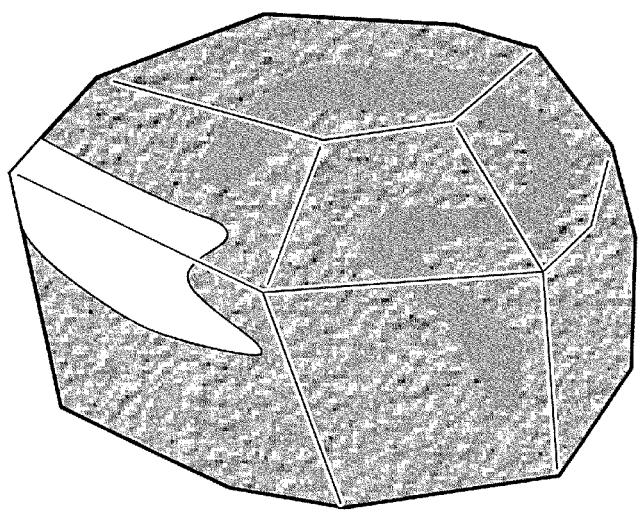

FIG. 19C and FIG. 19D illustrate other examples of the image-processed images the image composing unit 15 has composed.

FIG. 19C is similar to the original image of FIG. 3.

FIG. 19D is an image on which the user has performed the operation of FIG. 16. More specifically, FIG. 19D illustrates the image of FIG. 19B with an embedding operation of the color information performed thereon.

Referring to FIG. 19B and FIG. 19D, let I' represent the pixel value of each pixel of the image composed by the image composing unit 15, S represent the illumination component ($S=S_oS_d$ in accordance with formula (11)), and $R_d$ represent the modified reflectance component, and I' is expressed by the following formula (15):

$$I'=SR=S_oS_dR_d \qquad (15)$$

The image information output unit 16 outputs the image information that has undergone the image processing. The image-processed image information is transmitted to the display device 20. The display device 20 displays an image responsive to the image information.

Let (x,y) represent the location of the image of a region whose shade is controlled, and $S_oS_dR_d$ of formula (15) is the product of $S_o(x,y)$, $S_d(x,y)$, and $R_d(x,y)$. In a similar manner as described with reference to formulas (12) and (13), $S_d(x,y)$ is set to be $S_d(x+\Delta x, y+\Delta y)$, and $R_d(x,y)$ is set to be $R_d(x+\Delta x, y+\Delta y)$. A process matching the human three-dimensional perception is thus performed on the reflectance component $R_d$.

Formula (15) then becomes formula (16). In this case, the image processing unit 14 displaces a location displacement operation on the reflectance component R on the screen. The image composing unit 15 composes the image that has been image-processed by the image processing unit 14. In this way, a distortion is expressed using the reflectance component R.

$$I'=S_o(x,y)S_d(x+\Delta x,y+\Delta y)R_d(x+\Delta x,y+\Delta y) \qquad (16)$$

In accordance with the first exemplary embodiment, the concave and convex contour is generated by generating a new shade by multiplying a component based on information related to the shade of the original image by a component based on information related to the newly generated shade.

Since the illumination component $S_o$ is not accounted for in related art, information about the shade is not reflected, and it is difficult to express the texture. In accordance with the first exemplary embodiment, the concept of the illumination component $S_o$ having the information related to the shade is introduced, and the texture is more easily and variously expressed by operating the illumination component $S_o$. In accordance with the first exemplary embodiment, the shade texture image is reflected on the original image, and the shade texture image is thus reproduced in the original image.

The three-dimensional expression is presented in an easier and more various fashion by displacing the locations of the component $S_d$ and the reflectance component $R_d$ of the shade texture image on the image using $\Delta x$ and $\Delta y$.

Formula (14) is one of the basic formulas of the first exemplary embodiment. In the discussion heretofore, S, $S_o$, and $S_d$ representing the shade components are scalar, and I, I', R, and $R_d$ are vectors. In accordance with the first exemplary embodiment, I' may be expressed by the following formula (7) based on the premise that illumination contains RGB color information:

$$I'_R = S_{ro} S_{rd} R_r$$

$$I'_G = S_{go} S_{gd} R_g$$

$$I'_B = S_{bo} S_{bd} R_b \quad (17)$$

$S_{ro}$, $S_{go}$, and $S_{bo}$ represent the illumination component (shade component) $S_o$ expressed in a vector, such as $S_o=(S_{ro}, S_{go}, S_{bo})$, and $S_{rd}$, $S_{gd}$, and $S_{bd}$ represent the component $S_d$ of the newly generated shade texture image expressed in a vector, such as $S_d=(S_{rd}, S_{gd}, S_{bd})$. The merit of representing $S_o$ and $S_d$ in vectors is that illumination color is added to the shade. If the components have equal values, formula (17) is identical to formula (14) which handles $S_o$ and $S_d$ as scalar quantities. The same is true of formula (15).

In accordance with the first exemplary embodiment, reproduction is achieved with the information of the original image formula (14) maintained by modifying formula (14) to a composition formula with the original image, such as formula (18). In formula (18), I represents a vector indicating a pixel value of each pixel of the original image, and $k_1$ and $k_2$ are coefficients representing composition rates. In formula (18), a reflection rate of the original image is modified by adjusting $k_1$ and $k_2$.

$$I' = k_1 S_o S_d R + k_2 I \quad (18)$$

In the example described above, the component $S_d$ of the new shade texture image is generated, and the new concave and convex contour is reproduced on a particular object (cutout region). Alternatively, the new concave and convex expression may be reproduced on an ambient region of the object.

Figure 20A:
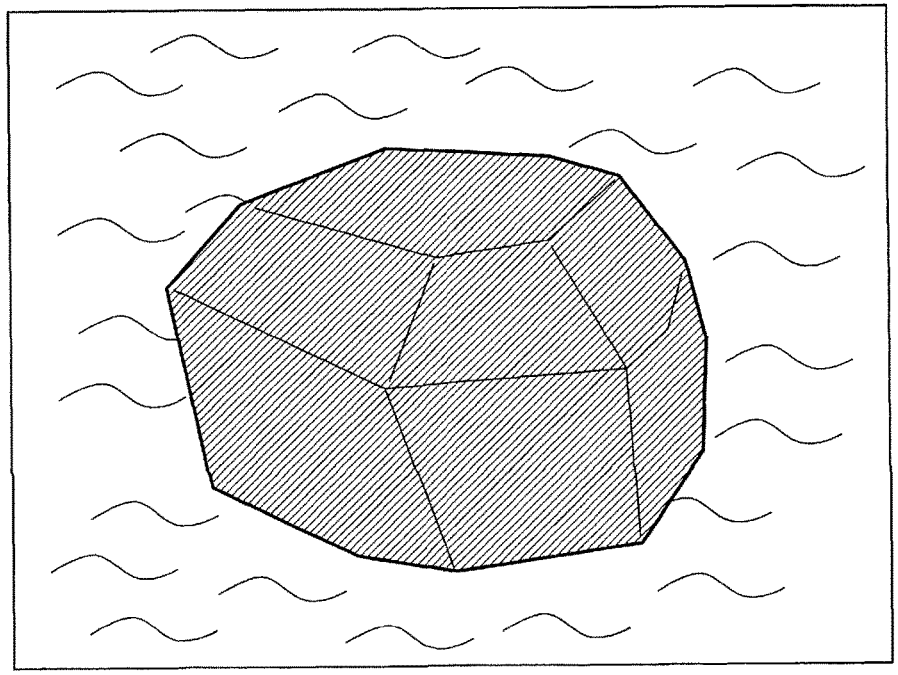
FIG. 20A and FIG. 20B illustrate examples of components of shade texture images that are generated in accordance with an ambient region of the object.
Figure 20B:
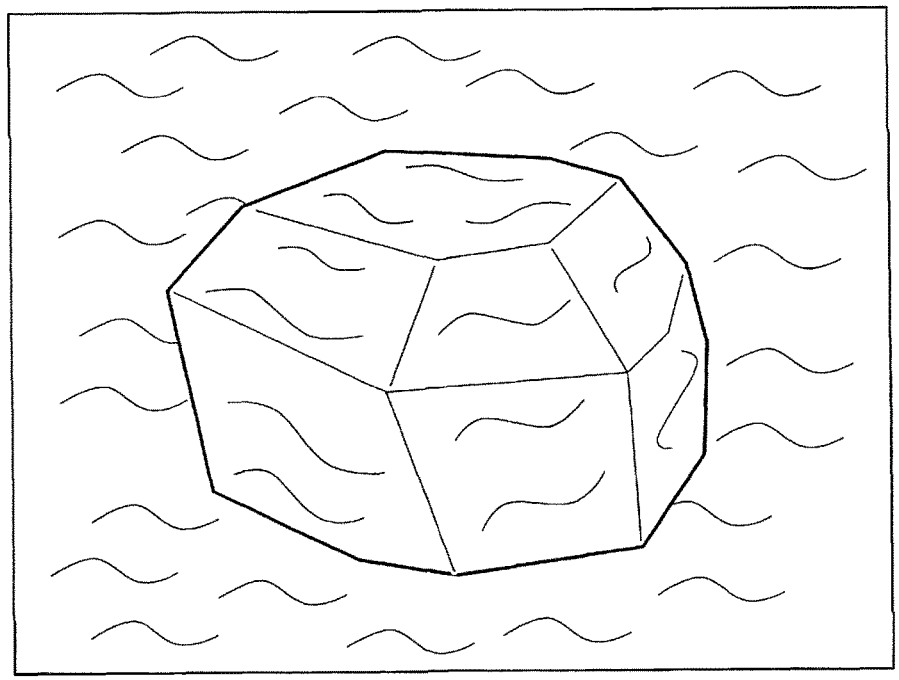

FIG. 20A and FIG. 20B illustrate examples of shade texture image components $S_d$ that are generated in accordance with an ambient region of the object.

FIG. 20A illustrates an object that is placed on a table having texture. The object is cut out, and the component $S_d$ of the shade texture image corresponding to a portion (ambient region) of the background of the object is generated as a new texture of the object, and the component $S_d$ is reflected on the cutout portion.

The image processing unit 14 performs the image processing to control the shade of the illumination component image of the image within a predetermined area (in this case, the region of the object), by using the illumination component image of the image outside the predetermined area (in this case, the ambient region as the background of the object).

The image processing unit 14 reproduces the shade of the ambient region on the object as illustrated in FIG. 20B, by distorting the shade texture component $S_d$ using $\Delta x$ and $\Delta y$ as described with reference to formulas (12) and (13). In this case, the representation of transmissiveness is felt.

Second Exemplary Embodiment

A second exemplary embodiment of the image processing apparatus 10 is described below.

In accordance with the second exemplary embodiment, a mirror surface is formed on the object surface. In the discussion of the second exemplary embodiment, a color of environmental light is added to the object surface.

The generation of the mirror surface on the object surface is described first.

Since the illumination component image is a shade component extracted from the object, a specular reflection component is generated by enhancing light intensity. In one method, the DOG filter expressed by formula (8) is applied on the illumination component image to extract higher frequency side.

Figure 21:
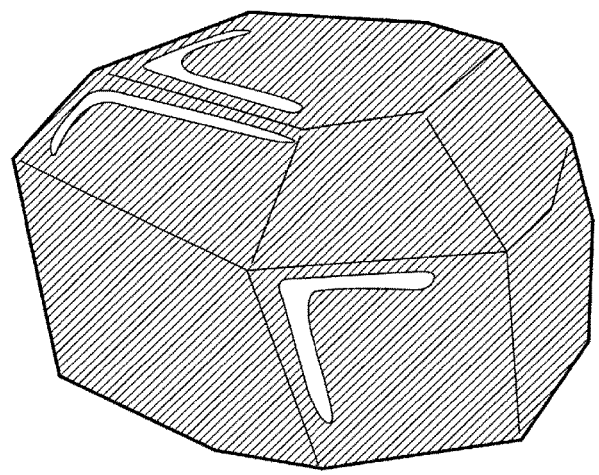
FIG. 21 illustrates a component that is generated along the outline of a shape as a result of extracting a high-frequency side of the illumination component image.

FIG. 21 illustrates a component that is generated along the edge of a shape as a result of extracting a high-frequency side of the illumination component image.

Figure 22:
FIG. 22 illustrates results that are obtained by enhancing and detecting the component.

FIG. 22 illustrates results that are obtained by enhancing and detecting the component.

The component may be set to be a mirror surface component. The image of FIG. 22 with the mirror surface component detected is also referred to as a "mirror surface component image". The mirror surface component image is generated by the image processing unit 14.

The mirror surface component image is generated from the illumination component image here, but may also be generated by performing a similar operation on the reflectance component image.

Figure 23A:
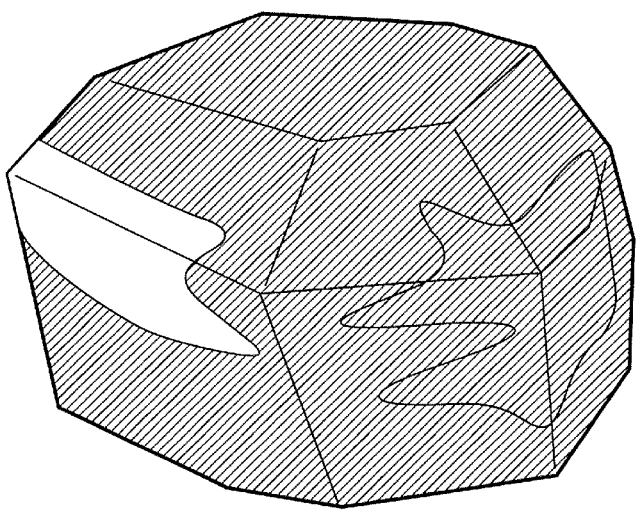
FIG. 23A and FIG. 23B illustrate an operation in which a mirror surface component image is combined to the image of FIG. 19B.
Figure 23A:
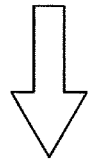
Figure 23B:
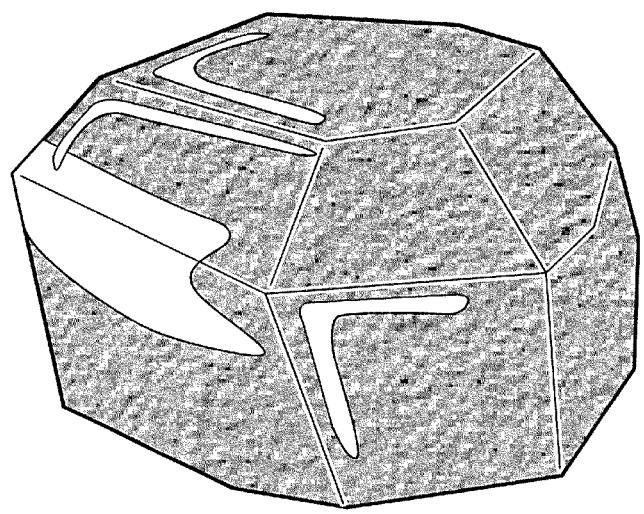

FIG. 23A and FIG. 23B illustrate an operation in which a mirror surface component image is combined to the image of FIG. 19B.

FIG. 23A is similar to the original image of FIG. 3.

FIG. 23B illustrates the image to which the mirror surface component image is combined, and indicates that a mirror surface is formed on the object surface.

The image composing unit 15 composes an image by adding the mirror surface component. The pixel value of each pixel forming the mirror surface component image is a vector having equal RGB values, and the vector is represented by $C_1$. The pixel value I' of each pixel of the image composed by the image composing unit 15 is expressed by the following formula (19) in view of formula (15):

$$I' = S_o S_d R_d + C_1 \quad (19)$$

If the mirror surface is desirably colored, the RGB values may be specified to be different values with different component rates.

If a mirror surface is generated on a region that does not extend along the outline of the shape, a conversion operation may be performed to project a particular gradation portion.

Figure 24:
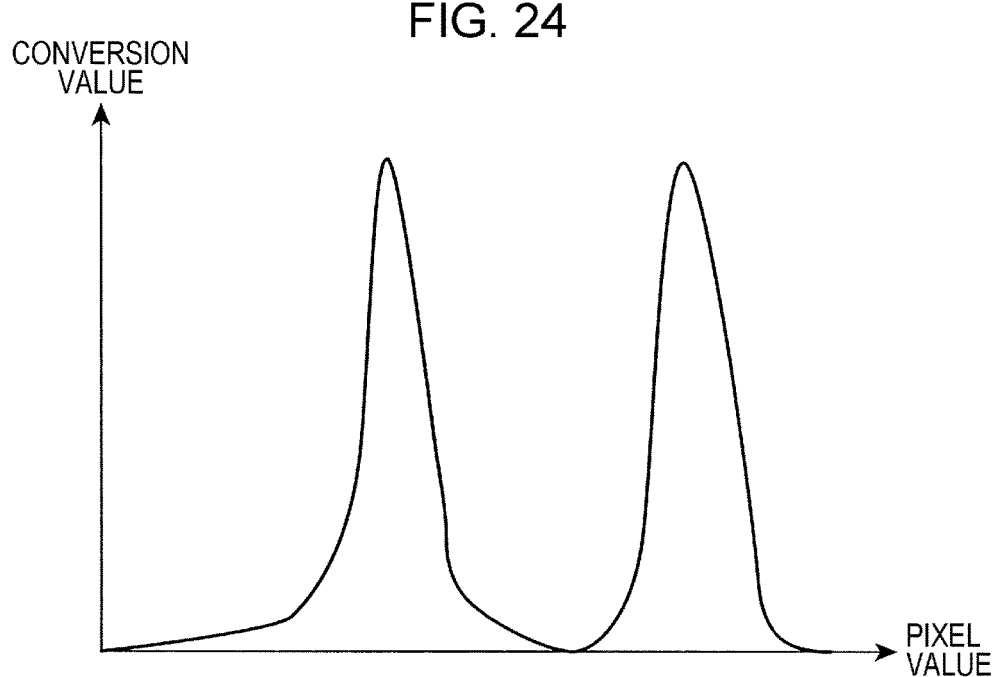
FIG. 24 illustrates an operation in which a conversion operation is performed to project a particular gradation portion.

FIG. 24 illustrates an operation in which a conversion operation is performed to project a particular gradation portion.

As illustrated in FIG. 24, the abscissa represents pixel values, and the ordinate represents the conversion values.

In this case, the operation is performed to project two pixel values. The operation is similar to an operation to extract a particular gradation value and to set the remaining gradation values to be zero. In such an operation, the possibility that any location on a surface other than the outline is set to be a mirror surface. This operation may also lead to a cockled surface. Using the tone curve to generate the image of FIG. 12, the shade may be converted, and a difference between the shade before conversion and the shade after the conversion may be set to be the mirror surface component.

Figure 25:
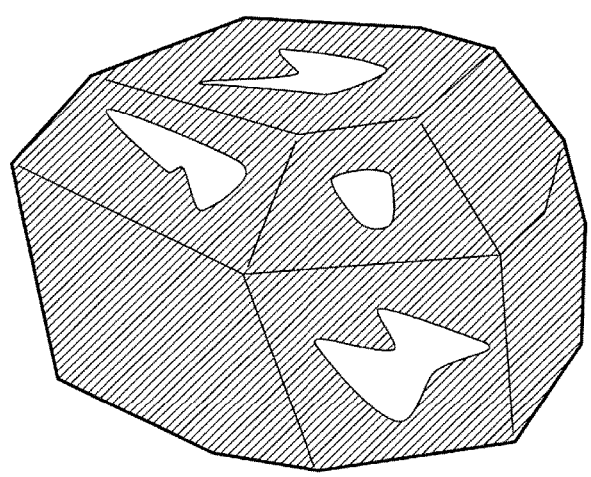
FIG. 25 illustrates the operation in which the conversion is performed to project a specific gradation portion of the illumination component image.

FIG. 25 illustrates the operation in which the conversion operation is performed to project a particular gradation portion of the illumination component image.

As illustrated in FIG. 25, mirror surfaces are generated on regions that do not extend along the outline of the shape. In the second exemplary embodiment, the mirror surface component is displaced in location on the image by performing on the mirror surface component the operations described with reference to formulas (12) through (13), and the shade texture image is thus distorted. In this case, the image processing unit 14 performs the displacement operation on the mirror surface component on the image. The image composing unit 15 composes the image that has been image-processed by the image processing unit 14. In this way, the distortion is expressed using the mirror surface component.

Figure 26A:
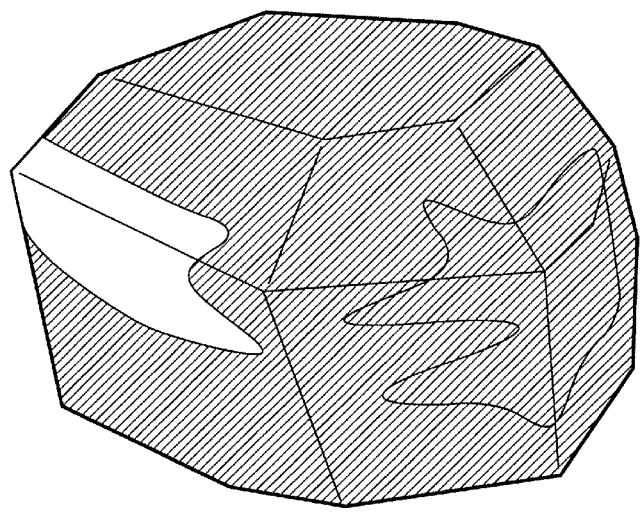
FIG. 26A and FIG. 26B illustrate an operation in which a mirror surface component image is combined to the image of FIG. 19B.
Figure 26A:
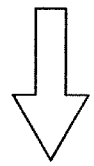
Figure 26B:
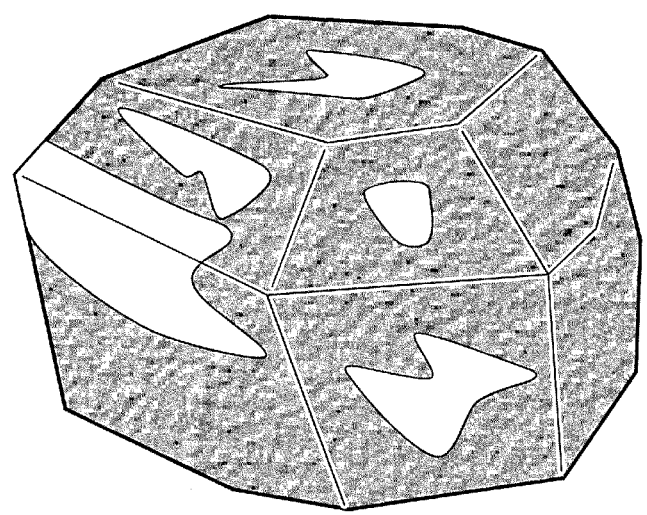

FIG. 26A and FIG. 26B illustrate an operation in which a mirror surface component image is composed with the image of FIG. 19B.

FIG. 26A is similar to the original image of FIG. 3.

FIG. 26B illustrates a composed mirror surface component image, and indicates mirror surfaces on the object surface.

The addition operation to add the color of the environmental light or the like to the object surface is described below.

A color vector that represent the color of the environmental light is specified. The color vector is an environmental light component representing the environmental light of the ambient of the object. Let $C_2$ represent the color vector, and the image composing unit 15 further adds the color vector $C_2$ to compose an image. The pixel value I' of each pixel of the composed image is expressed by the following formula (20) in accordance with formula (19):

$$I' = S_o S_d R_d + C_1 + C_2 \quad (20)$$

Figure 27A:
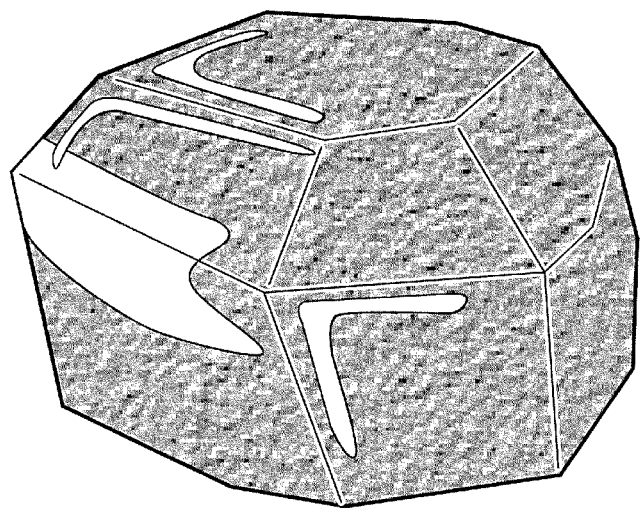
FIG. 27A and FIG. 27B illustrate an operation in which a color vector representing the color of environmental light is combined to the image of FIG. 26B.
Figure 27A:
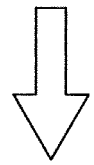
Figure 27B:
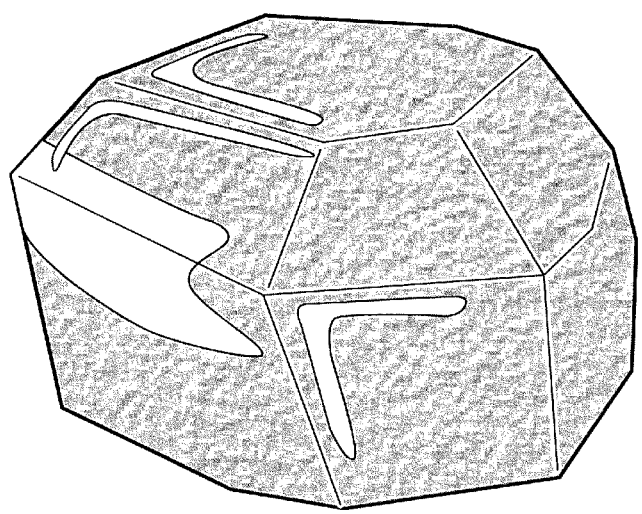

FIG. 27A and FIG. 27B illustrate the image of FIG. 26B to which the color vector $C_2$ representing the color of the environmental light is combined.

FIG. 27A illustrates the image identical to that of FIG. 26B.

FIG. 27B illustrates an image with the color vector $C_2$ combined with, and reflects the environmental light. The environmental light is reflected entirely on the object, but alternatively, the environmental light is reflected on a particular region of the object. In accordance with the second exemplary embodiment, the environmental light component is displaced in location on the screen by performing the operation described with reference to formulas (12) and (13) on the environmental light, and the shade texture image is thus distorted. In this case, the image processing unit 14 displaces the environmental light component in location on the image. The image composing unit 15 composes the image image-processed by the image processing unit 14. The distortion is thus expressed using the environmental light component.

Third Exemplary Embodiment

A third embodiment of the image processing apparatus 10 is described below.

In accordance with the third exemplary embodiment, the texture of the object becomes a sample texture if the user provides a sample texture image (sample image).

Figure 28A:
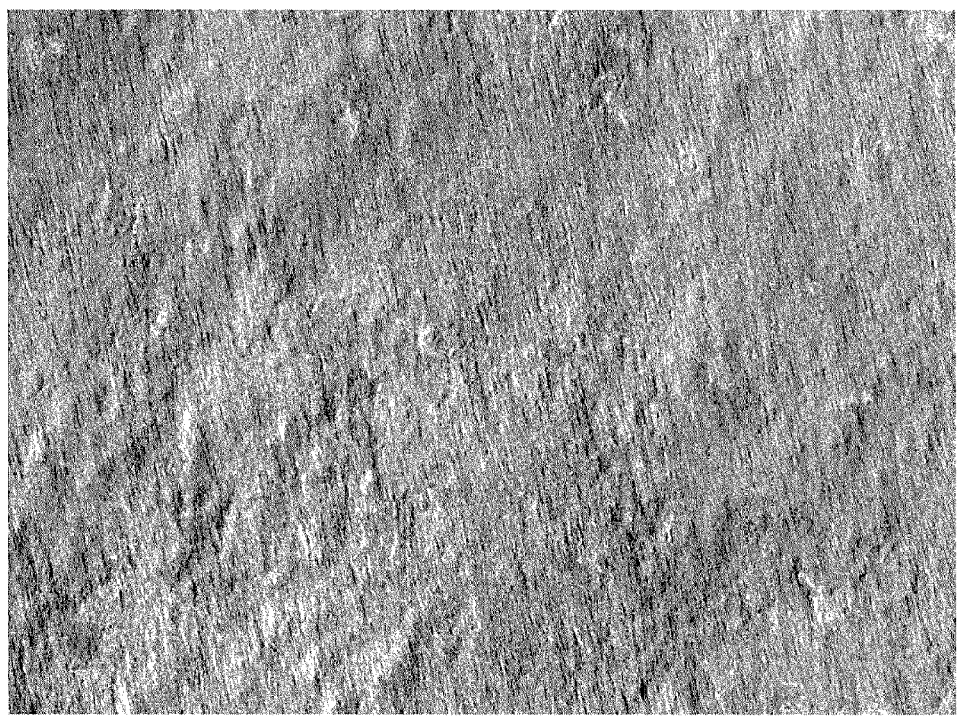
FIG. 28A illustrates an example of a sample texture image.

FIG. 28A illustrates an example of a sample texture image.

In accordance with the third exemplary embodiment, the image decomposing unit 13 decomposes the pixel value of each pixel forming the sample texture image into an illumination component and a reflectance component, thereby generating an illumination component image and a reflectance component image respectively responsive to the illumination component and the reflectance component.

Figure 28C:
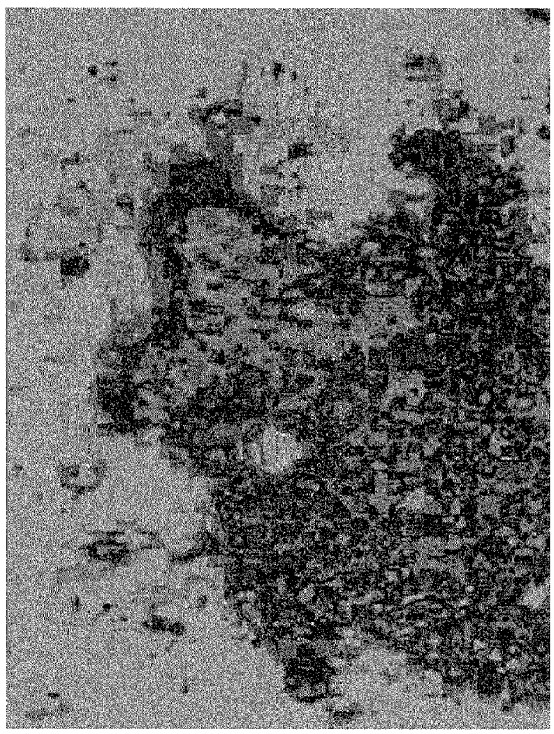
FIG. 28B and FIG. 28C illustrate results of image processing that has been performed on the illumination component image of the sample texture image.
Figure 28B:
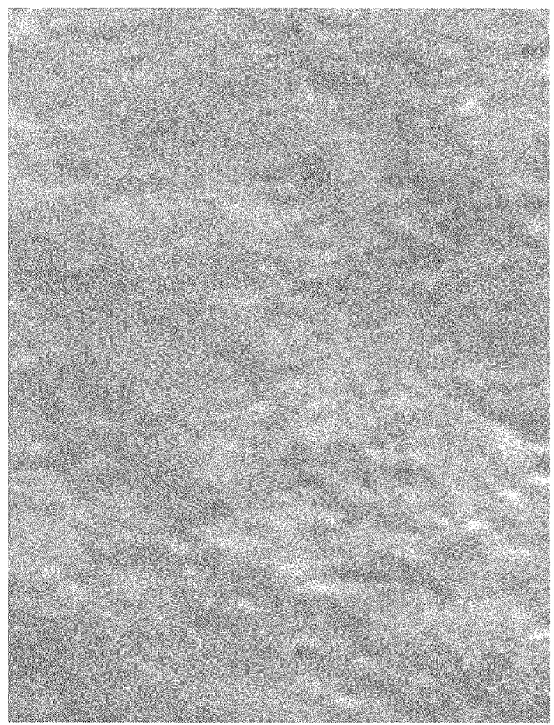

FIG. 28B and FIG. 28C illustrate results of image processing that has been obtained by decomposing the pixel value of each pixel forming the sample texture image into the illumination component and the reflectance component, and generating the illumination component image and the reflectance component image respectively responsive to the illumination component and the reflectance component.

FIG. 28B illustrates the illumination component image from which the shade of the sample texture image is extracted to express the concave and convex contour. FIG. 28C illustrates the reflectance component image from which chromaticity of the sample texture image is extracted.

The image processing unit 14 performs at least one of an operation to reflect the illumination component of the sample image on the illumination component of the original image and an operation to reflect the reflectance component of the sample image on the reflectance component of the original image.

The image composing unit 15 then composes the image that has undergone the image processing by the image processing unit 14.

There is little or no need for the control of chromaticity on the reflectance component image of the shade texture image, and it is sufficient to replace the original image with the reflectance component image.

The illumination component S and the reflectance component R of the sample texture image in the third exemplary embodiment are identical to the counterparts described in the first and second exemplary embodiments. $S_o$ and $R_d$ in formula (15) are those for the sample texture.

In accordance with the third exemplary embodiment, the texture of the sample image is reflected and the texture of the sample image is reproduced in the original image.

Fourth Exemplary Embodiment $S_d R_d$ are equivalent to the texture of the color original image. In accordance with a fourth exemplary embodiment, let $I_T$ represent a pixel vector of the sample texture, and formula (15) is re-written as formula (21):

$$I' = S_o I_T \quad (21)$$

Formula (21) may be interpreted to mean that an operation to reflect the illumination component $S_o$ on the sample image is performed by multiplying a pixel value $I_T$ of the sample image (a vector, such as RGB values) by the illumination component $S_o$ (a scalar quantity). In this case, the sample image having the shade of the original image is produced by reflecting the illumination component $S_o$ of the original image on the sample image. If the sample image with the illumination component $S_o$ reflected thereon is combined with the original image, the color and pattern of the surface may be modified to those of the sample image with the texture of the original image maintained. More specifically, a person viewing the modified image views the three-dimensional shape of the object as the original image but with the pattern thereof being that of the sample image.

An operation to reflect the illumination component $S_o$ on the sample image by multiplying the pixel value $I_T$ of the sample image by the illumination component $S_o$ is desirably performed. This operation easily maintains the texture of the original image in comparison with an operation to sum the pixel value $I_T$ of the sample image and the illumination component S.

The illumination component $S_o$ is not accounted for in the related art when the sample image is reflected on the original image. For this reason, a resulting image is an image that is simply a mixture of the sample image and the original image, and the texture of the original image is not maintained. In accordance with the fourth exemplary embodiment, the texture of the original image is maintained by reflecting the illumination component S, when the sample image is reflected on the original image.

The degree of reflection of the illumination component $S_o$ of the original image may be controlled using a composition rate that represents the degree of reflection of the sample image on the original image. In such a case, formulas (21) may be modified to formula (22). In formula (22), $k_1$ and $k_2$ are respectively coefficients representing the composition rates of the original image and the sample image. In formula (22), I represents a pixel value of the original image:

$$I'=k_1 S_o+I_T+k_2 I \quad (22)$$

Also, $k_1$ and $k_2$ are defined as follows: $0 \leq k_1 \leq 1$, $0 \leq k_2 \leq 1$, and $k_1+k_2=1$. Formula (22) may be re-written as formula (23):

$$I'=k_1 S_o I_T+(1-k_1)I \quad (23)$$

According to formulas (22) and (23), the reflection rate of the sample image to the original image may be changed by adjusting $k_1$ and $k_2$. For example, with $k_1=1$, and $k_2=0$, formula (21) is obtained, and the sample image is entirely reflected. In such a case, the modified image has the pattern of the sample image while the three-dimensional reproduction of the object on the original image is maintained as is. With $k_1=0$, and $k_2=1$, the sample image is not reflected at all. The original image remains unchanged. With $0<k_1<1$, and $0<k_2<1$, the modified image is somewhere between the two cases.

The image processing using another formula, such as the image processing to satisfy the three-dimensional human perception as expressed in formulas (12) and (18) described above, is applicable to the fourth exemplary embodiment. In such a case, the image processing unit 14 performs a displacement operation to displace the location the illumination component S and the reflectance component R on the sample texture image. The image composing unit 15 composes the image that has undergone the image processing by the image processing unit 14. In this way, the distortion is expressed using the illumination component S and the reflectance component R of the sample texture image.

The composition rate with the information of the original image may be controlled in accordance with formula (21) such as formula (18) that is the composition formula. If there is a concern in the fourth exemplary embodiment that a combination with the original image destroys the chromaticity information of the texture, the luminance component is combined with the original image in accordance with formula (21) but the other color component is not combined.

Let (Y', Cr', Cb') represent YCrCb values into which I' in formula (21) is converted, and (Y, Cr, Cb) represents a pixel value of the original image, and only the luminance component may be controlled in composition in accordance with formula (24). (Y", Cr", Cb") thus calculated reflect the state of the original image in terms of the shade, and the texture, and the state of the sample texture is reproduced in terms of chromaticity.

$$\begin{pmatrix} Y''_t \\ Cb''_t \\ Cr''_t \end{pmatrix} = \begin{pmatrix} k_1 Y'_t + k_2 Y \\ Cb'_t \\ Cr'_t \end{pmatrix} \quad (24)$$

In formula (24), $k_1$ and $k_2$ are coefficients representing composition rates as those in formula (18). With $0 \leq k_1 \leq 1$, formula (24) becomes formula (25), and formula (25) may be used. The same is true of formula (18).

$$\begin{pmatrix} Y''_t \\ Cb''_t \\ Cr''_t \end{pmatrix} = \begin{pmatrix} k_1 Y'_t + (1-k_1)Y \\ Cb'_t \\ Cr'_t \end{pmatrix} \quad (25)$$

As described above, a desired color image is obtained by converting thus obtained luminance and color difference signals YCrCb into RGB values. The luminance and color difference signals may be any signals in another color space, such as L*a*b* color space, as long as they indicate luminance and chromaticity.

In accordance with the fourth exemplary embodiment, formula (21) is re-written as formula (26) by introducing a function $F_s$ in order to control the degree of shade to be reflected.

$$I'=F_s(S_o)I_T \quad (26)$$

Figure 29A:
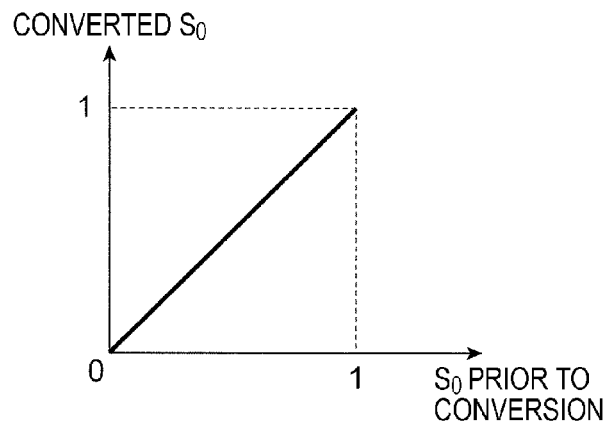
FIG. 29A through FIG. 29C illustrate function.
Figure 29B:
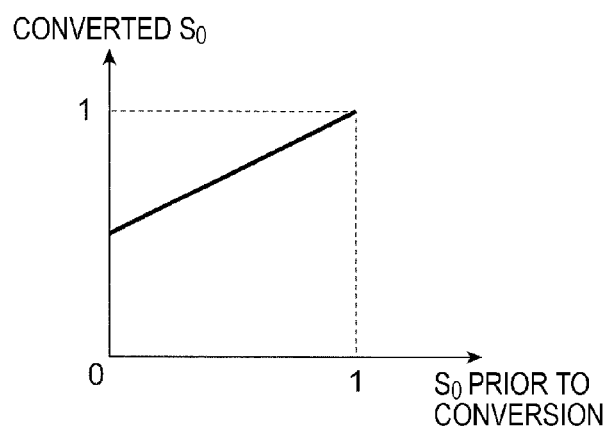
Figure 29C:
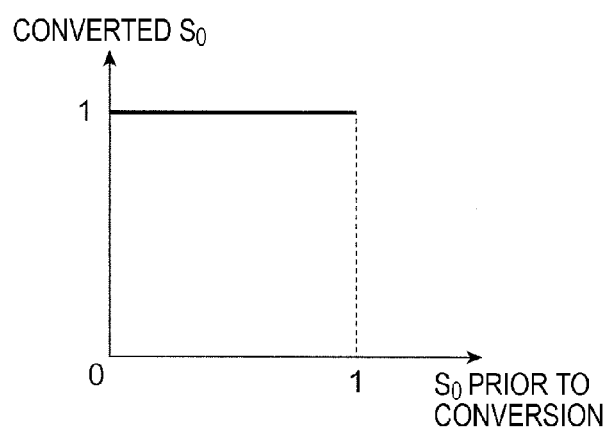

FIG. 29A through FIG. 29C illustrate the function $F_s$.

The function $F_s$ converts the illumination component $S_o$. In FIG. 29A through FIG. 29C, the abscissa represents the illumination component $S_o$ prior to conversion, and the ordinate represents the converted $S_o$.

If the function $F_s$ is a linear function having a gradient of 1 as illustrated in FIG. 29A, formula (26) becomes identical to formula (21). If the function $F_s$ is a constant function having a constant value 1 subsequent to conversion as illustrated in FIG. 29C, I' becomes the pixel vector $I_T$ of the sample texture. If the function $F_s$ is a linear function having an intercept as illustrated in FIG. 29B, the function $F_s$ is a function having characteristics somewhere between FIG. 29A and FIG. 29C. Introducing the function of FIG. 29B, such as $F_s$, the range of expression of the texture is broadened.

According to formula (26), the reflection rate of the illumination component $S_o$ on the sample image is modified by the function $F_s$. For example, with $F_s(S_o)=S_o$ as illustrated in FIG. 29A, formula (21) is applicable, and the illumination component $S_o$ is entirely reflected on the sample image. The modified image has the pattern of the sample image and the three-dimensional reproduction of the object is maintained in the original image. With $F_s(S_o)=1$ as illustrated in FIG. 29C, the illumination component $S_o$ is not reflected at all. In such a case, the modified image results from simply gluing the sample image onto the original image, and that portion looks planer. With the function $F_s$ as illustrated in FIG. 29B, the appearance is somewhere between the above two cases.

Formula (21) with the composition rates $k_1$ and $k_2$ applicable thereto is re-written to formula (22), and the composition rates $k_1$ and $k_2$ applicable are also applicable to formula (26). In such a case, formula (26) is re-written as formula (27). In formula (27), I represents a pixel value of the original image. In this way, the shade of the illumination component is controlled to achieve the texture the use desires using information such as the pattern of the sample image while the information of the original image maintained.

$$I'=k_1 F_s(S_o)I_T+k_2 I \quad (27)$$

Also, $k_1$ and $k_2$ are defined as follows: $0 \leq k_1 \leq 1$, $0 \leq k_2 \leq 1$, and $k_1+k_2=1$. Formula (27) may be re-written as formula (28):

$$I'=k_1 F_s(S_o)I_T+(1-k_1)I \quad (28)$$

According to formulas (27) and (28), the reflection rate of the sample image to the original image is modified by adjusting $k_1$ and $k_2$.

In accordance with the fourth exemplary embodiment, the shade and texture are controlled by adjusting the illumination component $S_o$ using the function $F_s$, and $k_1$ and $k_2$ as control factors in accordance with formulas (27) and (28). Furthermore, image quality related to reality may be enhanced and controlled by converting the illumination component (or luminance component) $S_o$ using a controlling function $f_c$. Formula (29) in which the function $f_c$ is applied to formula (28) is expressed as follows:

$$I' = k_1 F_s(f_c(S_o))I_T + (1-k_1)I \qquad (29)$$

FIG. 30A through FIG. 30D illustrate the function $f_c$.

The function $f_c$ converts the illumination component $S_o$, and in the illustrated examples, the abscissa represents $S_o$ prior to conversion, and the ordinate represents converted $S_o$.

The function $f_c$ controls illumination or luminance. FIG. 30A illustrates an example of the function $f_c$ that controls contrast. The function $f_c$ having the letter-S shape illustrated in FIG. 30A is more appropriate to express hardness because a shade difference is more enhanced. The function $f_c$ may be interpreted as a control factor that controls the shade difference on the illumination component (luminance component).

The function $f_c$ illustrated in FIG. 30B is similar to the function $f_c$ illustrated in FIG. 30A but different in terms of inflection point and degree of distortion from the function $f_c$ illustrated in FIG. 30A.

FIG. 30C illustrates an example of the function $f_c$ that controls contrast, but the function $f_c$ has an inverted letter-S shape. The function $f_c$ is appropriate to decreases a noise intensity or to express softness.

FIG. 30D illustrates the function $f_c$ similar to the function $f_c$ of FIG. 30C, but is different from the function $f_c$ of FIG. 30C in terms of inflection point and degree of distortion.

As illustrated in FIG. 30A through FIG. 30D, the function $f_c$ may be implemented using the sigmoid function, the logistic function, the gamma function, or the power function.

The function $f_c$ to be used may be selected from the functions $f_c$ of FIG. 30A through FIG. 30D depending on the luminance of the original image or expression target. Realistic representation of the object, such hardness or softness of the object depends on which function $f_c$ is selected in what way. The use of the function $f_c$ implements a variety of control methods in the texture.

In accordance with the fourth exemplary embodiment, the use of $k_1$ and $k_2$, and the parameter controlling the function $F_s$ (for example, the intercept) provides a variety of representations when the sample texture is transferred.

The method of the fourth exemplary embodiment is applicable to each of the first through third exemplary embodiments, and may be built in the formulas described heretofore. In accordance with the fourth exemplary embodiment, the shade texture image generated from the random noise described with reference to the first exemplary embodiment may be used as the sample image.

Figure 31:
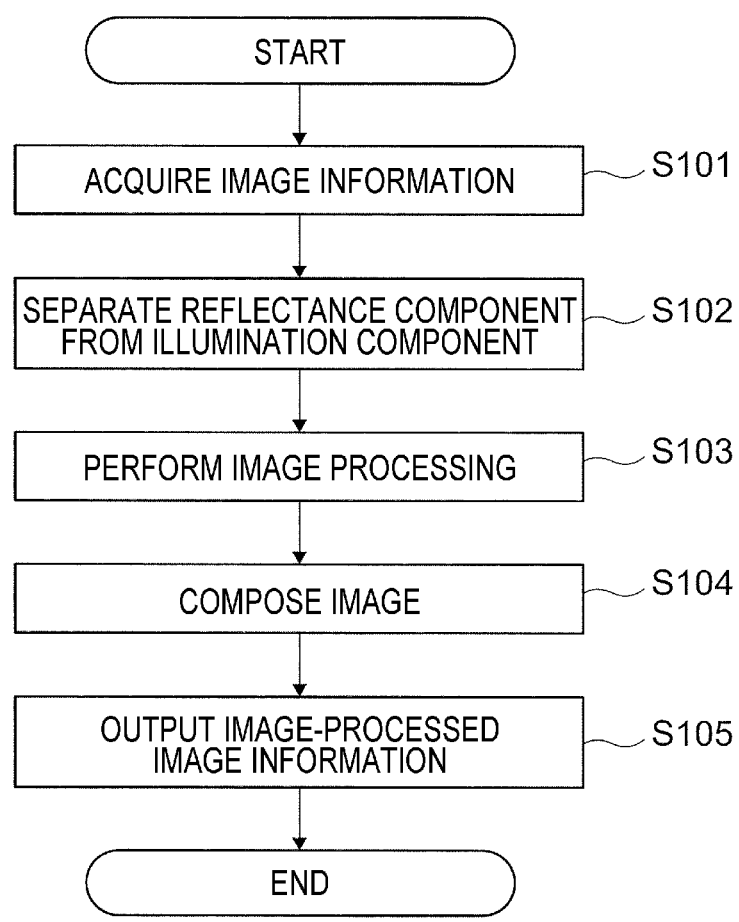
FIG. 31 is a flowchart illustrating a process of the image processing apparatus.

FIG. 31 is a flowchart illustrating a process of the image processing apparatus 10.

The process of the image processing apparatus 10 is described with reference to FIG. 2 and FIG. 31.

The image information acquisition unit 11 acquires the RGB data as the image information of the original image that is to be image-processed (step S101). In accordance with the third and fourth exemplary embodiments, the image information acquisition unit 11 herein acquires the sample texture image in response to a command from the user.

The image decomposing unit 13 decomposes the pixel value of each pixel of the original image into an illumination component and a reflectance component (step S102), thereby generating an illumination component image and a reflectance component image respectively corresponding to the illumination component and the reflectance component.

In accordance with the third exemplary embodiment, the sample texture image is decomposed into an illumination component and a reflectance component, and the illumination component image and the reflectance component image respectively corresponding to the illumination component and the reflectance component are generated.

The image processing unit 14 performs the image processing on at least one of the illumination component image and the reflectance component image (step S103).

More specifically, the image processing unit 14 controls the shade of the illumination component image, thereby generating the shade controlled image. This operation is performed by combining a random-noise image and the DOG filter as described above. The image processing unit 14 controls the chromaticity of the reflectance component image, thereby generating a chromaticity controlled image.

In accordance with the second exemplary embodiment, the image processing unit 14 generates the mirror surface component image. Furthermore in accordance with the third exemplary embodiment, the image processing unit 14 performs at least one of the operation to reflect the illumination component of the sample image on the illumination component of the original image and the operation to reflect the reflectance component of the sample image on the reflectance component of the original image. In accordance with the fourth exemplary embodiment, the illumination component $S_o$ is controlled by using $k_1$, $k_2$, the function $F_s$, and the function $f_c$ as control factors.

The image composing unit 15 composes the image that has undergone the image processing by the image processing unit 14 (step S104).

More specifically, the image composing unit 15 generates an image-processed image using the shade controlled image and the chromaticity controlled image generated by the image processing unit 14.

In accordance with the second exemplary embodiment, the image is composed using the mirror surface component image and the color vector representing the color of the environment light. In accordance with the fourth exemplary embodiment, the image is composed by gluing onto the original image the sample image with the illumination component $S_o$ reflected thereon.

The image information output unit 16 outputs the image-processed image information (step S105). The image information is RGB data. The RGB data is sent to the display device 20 and the image-processed image is displayed on the display screen 21.

In accordance with the first through fourth exemplary embodiments, a natural image is decomposed into the components (such as the illumination component and the reflectance component) that affect characteristics of the objects, such as the texture, and the image is controlled on a per component basis in each of the image space and the color space. As a result, an image processing apparatus that easily controls an image to a high-quality texture is thus provided. Characteristics, such as concave and convex contour, are generated based on the decomposed component images (the illumination component image and the reflectance component image). As a result, an operation to transfer texture characteristics of the sample texture image to part of the original image is easily performed.

In accordance with the exemplary embodiments, the object having a simple background has been discussed. If an object has a complex background, a region of the object that serves as a control target is cut out as a user specified region, and that cutout region may be used as a characteristic control region where shade or the like is controlled. The shade texture image or the sample texture image, described above, may be created so that the characteristic control target region is covered. Portions of the shade texture image or the sample texture image, each having an appropriate size, are generated, and then the portions are linked using a kilting process to a size that covers the entire object.

Figure 32A:
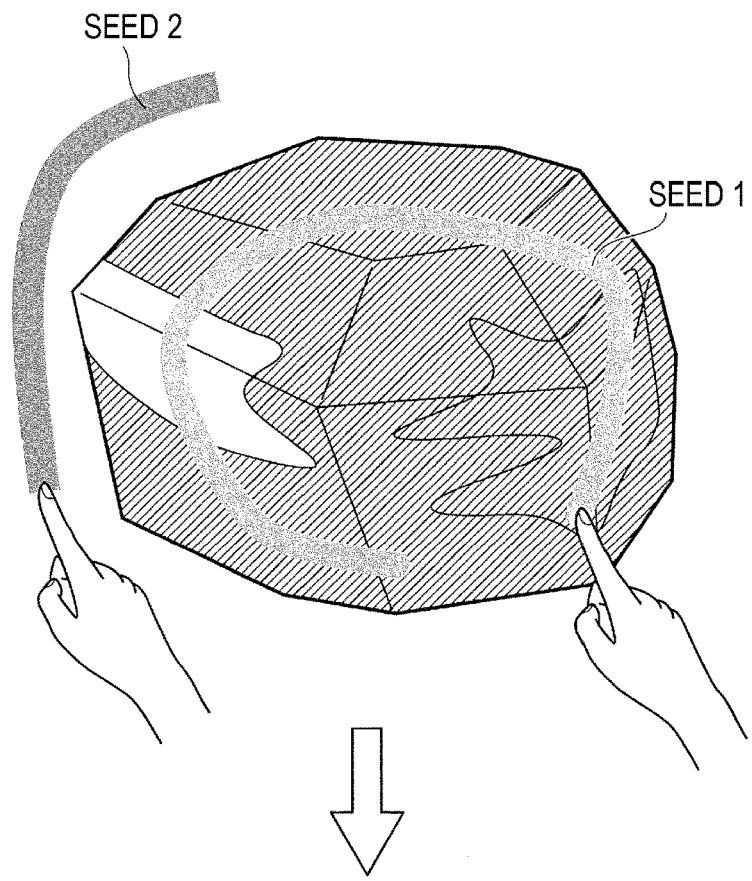
FIG. 32A and FIG. 32B illustrate a task a user performs in an interactive fashion to specify a region.
Figure 32B:
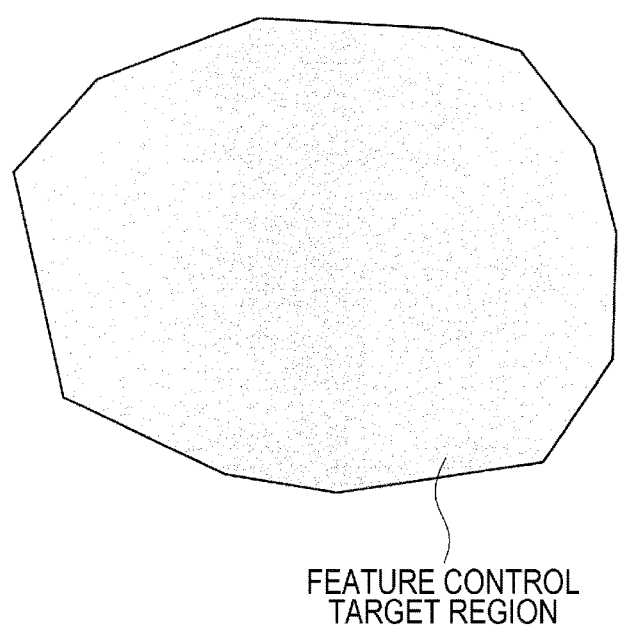

FIG. 32A and FIG. 32B illustrate a task a user performs in an interactive fashion to specify a region.

FIG. 32A illustrates the case in which the user specifies the object as a foreground, and a background of the object.

The user gives a representing trajectory to each of the foreground and the background. The trajectory may be input using the input device 30. More specifically, if the input device 30 is a mouse, the user drags the mouse to draw an image G displayed on the display screen 21 of the display device 20. If the input device 30 is a touchpanel, the user draws the trajectory by using a user's finger or a touchpen to trace the image. A point may be given rather than the trajectory. More specifically, it is sufficient if the user provides information indicative of a location that represents each region of the object or the like. The trajectory or point may also be referred to as a "seed". The seed drawn on the object is a seed 1, and the seed drawn on the background is a seed 2.

If pixel values of pixels, one pixel in the seed and another pixel surrounding the seed, are close in value to each other, then these two pixels are linked. If the pixel values are not close, the pixels are not linked. These operations are repeated to expand the region. Through this region expansion method a specified region is cut out.

FIG. 32B illustrates the object serving as a foreground that is cut out through the region expansion method.

The process to be performed by the image processing apparatus 10 may be interpreted to mean an image processing method that includes decomposing the pixel value of each pixel forming the original image into the illumination component and the reflectance component, generating the illumination component image and the reflectance component image, performing image processing to control the shade of the illumination component image, and composing the image that has undergone the image processing.

A hardware configuration of the image processing apparatus 10 is then described below.

Figure 33:
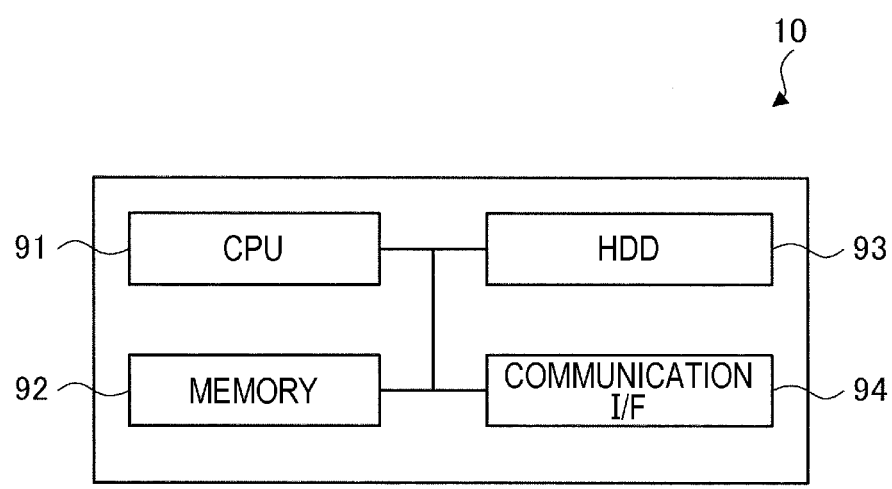
FIG. 33 illustrates a hardware configuration of the image processing apparatus.

FIG. 33 illustrates a hardware configuration of the image processing apparatus 10.

The image processing apparatus 10 may be implemented using a personal computer as described above. The image processing apparatus 10 includes a central processing unit (CPU) 91 serving as a processor, a memory 92 and a hard disk drive (HDD) 93, serving as a memory device. The CPU 91 executes a variety of programs including an operating system (OS), and application software programs. The memory 92 serves as a memory area that saves the programs and data. The HDD 93 serves as a memory area that saves data input to the programs and data output from the programs.

The image processing apparatus 10 further includes a communication interface (also referred to communication I/F) 94 that communicates with the outside.

The process to be performed by the image processing apparatus 10 in the exemplary embodiments is provided as a computer program, such as an application software program.

The process to be performed by the image processing apparatus 10 may be interpreted to mean a computer program. The computer program causes a computer to perform the image processing method. As described above, the image processing method includes an image decomposing function to decompose the pixel value of each pixel forming the original image into the illumination component and the reflectance component, and to generate the illumination component image, and an image composing function to reflect the illumination component on the sample image serving as a sample of image, and to combine the sample image with the illumination component reflected thereon to the original image.

The computer program implementing the exemplary embodiments may be not only supplied via communication media but also supplied in a recorded form on a recording medium, such as a compact disk read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   at least one processor configured to execute:
   an image decomposing unit configured to decompose a pixel value of each pixel forming an original image into an illumination component and a reflectance component to generate an illumination component image; and
   an image composing unit configured to reflect the illumination component on a sample image serving as a sample of image, and to combine the sample image having the illumination component reflected thereon with the original image,
   wherein the pixel value is decomposed according to the formula:

$$I = SR$$

wherein I represents the pixel value, S represents the illumination component, and R represents the reflectance component.

2. The image processing apparatus according to claim 1, wherein the image composing unit is configured to reflect the illumination component on the sample image by multiplying the pixel value of the sample image by the illumination component.

3. The image processing apparatus according to claim 1, wherein the at least one processor is further configured to execute an image processing unit configured to adjust the illumination component using a control factor that determines a degree of reflection of the illumination component.

4. The image processing apparatus according to claim 2, wherein the at least one processor is further configured to execute an image processing unit configured to adjust the illumination component using a control factor that determines a degree of reflection of the illumination component.

5. The image processing apparatus according to claim 1, wherein the sample image is generated in accordance with a random noise.

6. An image processing apparatus, comprising:
at least one processor configured to execute:
an image decomposing unit configured to decompose a pixel value of each pixel forming an original image into an illumination component and a reflectance component to generate an illumination component image and a reflectance component image;
an image processing unit configured to perform image processing by controlling shade of the illumination component image; and
an image composing unit configured to compose an image that has undergone the image processing by the image processing unit,
wherein the pixel value is decomposed according to the formula:

$$I=SR$$

wherein I represents the pixel value, S represents the illumination component, and R represents the reflectance component.

7. The image processing apparatus according to claim 6, wherein the image processing unit is configured to control the shade of the illumination component image using an image that is generated in accordance with a random noise.

8. The image processing apparatus according to claim 7, wherein the image processing unit is configured to control the shade of the illumination component image using an image that is controlled in terms of a frequency and a bearing of the random noise.

9. The image processing apparatus according to claim 6, wherein the image processing unit is configured to perform the image processing by controlling the shade of a first area within the illumination component image using a second area of the illumination component image outside the first area.

10. The image processing apparatus according to claim 6, wherein the image processing unit is configured to generate a mirror surface component representing a mirror surface from the illumination component image or the reflectance component image, and
wherein the image composing unit is configured to compose the image by adding the mirror surface component.

11. The image processing apparatus according to claim 7, wherein the image processing unit is configured to generate a mirror surface component representing a mirror surface from the illumination component image or the reflectance component image, and
wherein the image composing unit is configured to compose the image by adding the mirror surface component.

12. The image processing apparatus according to claim 8, wherein the image processing unit is configured to generate a mirror surface component representing a mirror surface from the illumination component image or the reflectance component image, and
wherein the image composing unit is configured to compose the image by adding the mirror surface component.

13. The image processing apparatus according to claim 9, wherein the image processing unit is configured to generate a mirror surface component representing a mirror surface from the illumination component image or the reflectance component image, and
wherein the image composing unit is configured to compose the image by adding the mirror surface component.

14. The image processing apparatus according to claim 6, wherein the image composing unit is configured to compose the image by further adding an environmental light component representing ambient environmental light.

15. The image processing apparatus according to claim 7, wherein the image composing unit is configured to compose the image by further adding an environmental light component representing ambient environmental light.

16. The image processing apparatus according to claim 6, wherein the image processing unit is configured to decompose the pixel value of each pixel forming a sample image serving as a sample of image into an illumination component and a reflectance component to generate an illumination component image and a reflectance component image corresponding to the sample image; and
wherein the image processing unit is configured to perform at least one of an operation to reflect the illumination component of the sample image on the illumination component of the original image and an operation to reflect the reflectance component of the sample image on the reflectance component of the original image.

17. The image processing apparatus according to claim 14, wherein the image processing unit is configured to generate a mirror surface component representing a mirror surface from the illumination component image or the reflectance component image, and to displace on the image a location of at least one of the illumination component, the reflectance component, the mirror surface component, and the environmental light component.

18. An image processing method, comprising:
decomposing a pixel value of each pixel forming an original image into an illumination component and a reflectance component to generate an illumination component image; and
reflecting the illumination component on a sample image serving as a sample of image, and combining the sample image having the illumination component reflected thereon with the original image,
wherein the pixel value is decomposed according to the formula:

$$I=SR$$

wherein I represents the pixel value, S represents the illumination component, and R represents the reflectance component.

19. An image processing system, comprising:
a display configured to display an image; and
an image processing apparatus configured to perform image processing on image information of the image displayed on the display,
wherein the image processing apparatus includes at least one processor configured to execute:
an image decomposing unit configured to decompose a pixel value of each pixel forming an original image into an illumination component and a reflectance component to generate an illumination component image; and an image composing unit configured to reflect the illumination component on a sample image serving as a sample of image, and to combine the sample image having the illumination component reflected thereon with the original image, wherein the pixel value is decomposed according to the formula:

$I=SR$ wherein I represents the pixel value, S represents the illumination component, and R represents the reflectance component.

20. A non-transitory computer readable medium storing a program causing a computer to execute a process for processing an image, the process comprising:

decomposing a pixel value of each pixel forming an original image into an illumination component and a reflectance component to generate an illumination component image; and reflecting the illumination component on a sample image serving as a sample of image, and combining the sample image having the illumination component reflected thereon with the original image, wherein the pixel value is decomposed according to the formula:

$I=SR$ wherein I represents the pixel value, S represents the illumination component, and R represents the reflectance component.

* * * * *